(12) United States Patent
Lee

(10) Patent No.: US 10,578,909 B2
(45) Date of Patent: Mar. 3, 2020

(54) DISPLAY APPARATUS WITH DICHROIC FILTER

(71) Applicant: SAMSUNG ELECTRONICS CO., LTD., Suwon-si (KR)

(72) Inventor: Kye Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 15/712,966

(22) Filed: Sep. 22, 2017

(65) Prior Publication Data

US 2018/0149914 A1 May 31, 2018

(30) Foreign Application Priority Data

Nov. 28, 2016 (KR) .................. 10-2016-0159621

(51) Int. Cl.
*G02F 1/1335* (2006.01)
*F21V 8/00* (2006.01)

(52) U.S. Cl.
CPC ..... *G02F 1/133514* (2013.01); *G02B 6/0055* (2013.01); *G02F 1/133536* (2013.01); *G02F 1/133615* (2013.01); *G02F 2001/133521* (2013.01); *G02F 2202/108* (2013.01); *G02F 2203/02* (2013.01)

(58) Field of Classification Search
CPC ......... G02F 1/133514; G02F 1/133617; G02F 1/133536; G02F 1/133615; G02F 2001/133521; G02F 2202/108; G02F 2203/02; G02B 6/0055
USPC ........................................................ 349/106
See application file for complete search history.

(56) References Cited

U.S. PATENT DOCUMENTS

| | | | |
|---|---|---|---|
| 6,864,626 B1 | 3/2005 | Weiss et al. | |
| 2006/0274226 A1 | 12/2006 | Im et al. | |
| 2007/0007881 A1 | 1/2007 | Kim et al. | |
| 2007/0014127 A1 | 1/2007 | Hara et al. | |
| 2011/0205750 A1 | 8/2011 | Krijn et al. | |
| 2013/0135558 A1 | 5/2013 | Kim et al. | |
| 2013/0335677 A1* | 12/2013 | You .................. | G02F 1/133609 349/65 |
| 2014/0204128 A1 | 7/2014 | Jiang | |
| 2014/0240640 A1 | 8/2014 | Roberts et al. | |

(Continued)

FOREIGN PATENT DOCUMENTS

| | | |
|---|---|---|
| JP | 2016-8998 A | 1/2016 |
| KR | 10-2012-0097774 A | 9/2012 |

OTHER PUBLICATIONS

Communication dated Apr. 24, 2018, issued by the European Patent Office in counterpart European Application No. 17194634.6.

*Primary Examiner* — Nathanael R Briggs
*Assistant Examiner* — William D Peterson
(74) *Attorney, Agent, or Firm* — Sughrue Mion, PLLC

(57) ABSTRACT

A display apparatus including a dichroic filter is provided. The display apparatus includes a display panel including a liquid crystal layer and a quantum dot color filter disposed on the liquid crystal layer; a light source configured to emit light; a light guide plate configured to guide the light emitted from the light source towards the display panel; and a dichroic filter provided on a first side the light guide plate that is opposite to a second side of the light guide plate on which the display panel is provided, the dichroic filter being configured to concentrate the light emitted from the light source.

17 Claims, 23 Drawing Sheets

(56) References Cited

U.S. PATENT DOCUMENTS

| | | |
|---|---|---|
| 2014/0293186 A1 | 10/2014 | Ek et al. |
| 2015/0109560 A1 | 4/2015 | Guo et al. |
| 2018/0046022 A1* | 2/2018 | Morita .............. G02F 1/133528 |
| 2018/0196182 A1* | 7/2018 | Wang ................... G02B 6/0003 |

* cited by examiner

DISPLAY APPARATUS WITH DICHROIC FILTER

This application claims the priority from Korean Patent Application No. 10-2016-0159621, filed on Nov. 28, 2016 in the Korean Intellectual Property Office, the disclosure of which is incorporated herein by reference.

BACKGROUND

1. Field

Apparatuses consistent with example embodiments relate to a display apparatus, and more particularly, to a display apparatus with a structure capable of improving concentration of light emitted.

2. Description of the Related Art

A display apparatus is an output apparatus configured to visually display data information, such as a letter, a figure, an image, and the like.

A display apparatus may include a self-emissive display panel such as an organic light-emitting diode (OLED) panel, or a passive-emissive display panel such as a liquid crystal display (LCD) panel.

A display apparatus including a passive-emissive display panel may include a backlight unit that supplies light to the passive-emissive display panel.

A display apparatus including a passive-emissive, such as a display apparatus including an LCD panel, may include blue, green, and red color filters, which are each assigned to corresponding pixels, thereinside. Light emitted from the backlight unit is absorbed by the color filters except for light having a color corresponding to each of the color filters, respectively, when light passes through each pixel of the color filters. Through the above-described process, blue, green, and red colors are displayed on a screen.

When each of the above-described color filters is replaced with a quantum dot material that converts a color of light into a specific color, and a light source emitting blue light is applied thereto, a color of light passing through the quantum dot material can be converted into the specific color of light which may improve the efficiency of a display apparatus, unlike a conventional color filter. Also, since the converted light has a characteristic of being emitted in all directions, lateral visibility of the display apparatus may be improved.

However, since an LCD panel has a characteristic in which black transmittance on a lateral side of the LCD panel is higher than that on a front side thereof and a quantum dot material has a characteristic of diffusing light in all directions, when each color filter is replaced with the quantum dot material, a contrast ratio, based on the luminance of the brightest color to that of the darkest color on the front side of the display apparatus may be decreased.

SUMMARY

Example embodiments provide a display apparatus capable of improving a contrast ratio by increasing a concentration of light.

According to an aspect of an example embodiment, there is provided display apparatus including: a display panel including a liquid crystal layer and a quantum dot color filter disposed on the liquid crystal layer; a light source configured to emit light; a light guide plate configured to guide the light emitted from the light source towards the display panel; and a dichroic filter provided on a first side the light guide plate that is opposite to a second side of the light guide plate on which the display panel is provided, the dichroic filter being configured to concentrate the light emitted from the light source.

The display apparatus may further include an absorbing member disposed on the dichroic filter and configured to absorb light that passes through the dichroic filter.

The light guide plate may include a light incident surface on which the light emitted from the light source is incident and a light emitting surface from which the light incident on the light guide plate is emitted towards the display panel, and the display apparatus may further include a prism sheet disposed between the light guide plate and the display panel, and configured to refract light transmitted from the light emitting surface of the light guide plate, the prism sheet including a plurality of prisms protruding toward the light emitting surface of the light guide plate.

The light guide plate may further include: a light emitting corresponding surface that is opposite to the light emitting surface; and a pattern in a form of a convex lens formed on the light emitting corresponding surface and configured to guide light incident on the light incident surface of the light guide plate to the light emitting surface of the light guide plate.

The display panel may further include a polarizer disposed between the liquid crystal layer and the prism sheet, and configured to polarize light passing through the prism sheet, and the display apparatus may further include an additional dichroic filter disposed between the polarizer and the prism sheet, and configured to concentrate the light emitted from the light source.

The display panel may further include: a polarizer disposed on the prism sheet and configured to polarize light that passes through the prism sheet; and a substrate disposed between the polarizer and the liquid crystal layer, and configured to apply a current to the liquid crystal layer, and the display apparatus may further include an additional dichroic filter disposed between the polarizer and the prism sheet, and configured to concentrate the light emitted from the light source.

The display panel may further include: a reflective polarizer disposed on the prism sheet and configured to polarize light that passes through the prism sheet; and a polarizer disposed on the reflective polarizer and configured to polarize light that passes through the reflective polarizer.

The display apparatus may further include an additional dichroic filter disposed between the prism sheet and the reflective polarizer, and configured to concentrate the light emitted from the light source.

The display apparatus may further include an additional dichroic filter disposed between the polarizer and the reflective polarizer, and configured to concentrate the light emitted from the light source.

The display panel may further include a substrate disposed between the liquid crystal layer and the polarizer, and configured to apply a current to the liquid crystal layer, and the display apparatus may further include an additional dichroic filter disposed between the polarizer and the substrate, and configured to concentrate the light emitted from the light source.

According to an aspect of another example embodiment, there is provided a display apparatus including: a display panel; a light source configured to emit light; a light guide plate configured to guide the light emitted from the light source towards the display panel, the light guide plate including a light incident surface on which the light emitted from the light source is incident, a light emitting surface from which the light incident on the light guide plate is emitted towards the display panel, and a light emitting corresponding surface that is opposite to the light emitting surface; a dichroic filter provided on the light emitting corresponding surface of the light guide plate; and at least one additional dichroic filter provided on the light emitting surface of the light guide plate.

The display apparatus may further include an absorbing member disposed on the dichroic filter to absorb light that passes through the dichroic filter.

The at least one additional dichroic filter may include a first additional dichroic filter, and the display apparatus may further include a prism sheet disposed between the light guide plate and the first additional dichroic filter, the prism sheet including a plurality of prisms protruding toward the light emitting surface of the light guide plate.

The display panel may include a polarizer disposed on the prism sheet and configured to polarize light that passes through the prism sheet, and the first additional dichroic filter may be disposed between the polarizer and the prism sheet.

The display panel may further include: a liquid crystal layer; and a substrate disposed between the polarizer and the liquid crystal layer and configured to apply a current to the liquid crystal layer, and the at least one additional dichroic filter may further include a second additional dichroic filter disposed between the polarizer and the substrate.

According to an aspect of another example embodiment, there is provided display apparatus including: a display panel including a liquid crystal layer and a quantum dot color filter disposed on the liquid crystal layer; a light source configured to emit light; a light guide plate configured to guide the light emitted from the light source towards the display panel; and a plurality of dichroic filters disposed on a propagation path of light through which light emitted from the light source is propagated.

The light guide plate may include a light incident surface on which the light emitted from the light source is incident, a light emitting surface from which the light incident on the light guide plate is emitted towards the display panel, and a light emitting corresponding surface that is opposite to the light emitting surface, and the plurality of dichroic filters may include a first dichroic filter provided on the light emitting corresponding surface of the light guide plate and configured to concentrate light emitted from the light source.

The display apparatus may further include a prism sheet disposed on the light guide plate and configured to refract light emitted through the light emitting surface of the light guide plate, the prism sheet including a plurality of prisms protruding toward the light emitting surface of the light guide plate, and the display panel may further include a polarizer disposed between the liquid crystal layer and the prism sheet and configured to polarize light that passes through the prism sheet.

The plurality of dichroic filters may further include a second dichroic filter disposed between the polarizer and the prism sheet, and configured to concentrate light emitted from the light source together with the first dichroic filter.

The display panel may further include a substrate disposed between the polarizer and the liquid crystal layer, and configured to apply current to the liquid crystal layer, and the plurality of dichroic filters may further include a second dichroic filter disposed between the polarizer and the substrate, and configured to concentrate light emitted from the light source with the first dichroic filter.

According to an aspect of another example embodiment, there is provided a display apparatus including: a light source configured to emit light; a light guide plate configured to guide the light emitted from the light source, the light guide plate including a light incident surface on which the light emitted from the light source is incident, a light emitting surface from which the light incident on the light guide plate is emitted, and a light emitting corresponding surface that is opposite to the light emitting surface; a display panel provided on the light emitting side of the light guide plate; and at least one dichroic filter provided on at least one of the light emitting surface the light guide plate and the light emitting corresponding side of the light guide plate, the dichroic filter being configured to concentrate the light emitted from the light source.

The display apparatus may further include a prism sheet disposed between the light guide plate and the display panel, and configured to refract light emitted through the light emitting surface of the light guide plate, the prism sheet including a plurality of prisms protruding toward the light emitting surface of the light guide plate.

The at least one dichroic filter may further include a first dichroic filter disposed between the prism sheet and the display panel.

The at least one dichroic filter may include a first dichroic filter disposed on the light emitting corresponding side of the light guide plate.

The at least one dichroic filter may further include a second dichroic filter disposed between the prism sheet and the display panel.

The display apparatus may further include an absorbing member disposed on the dichroic filter and configured to absorb light that passes through the dichroic filter.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
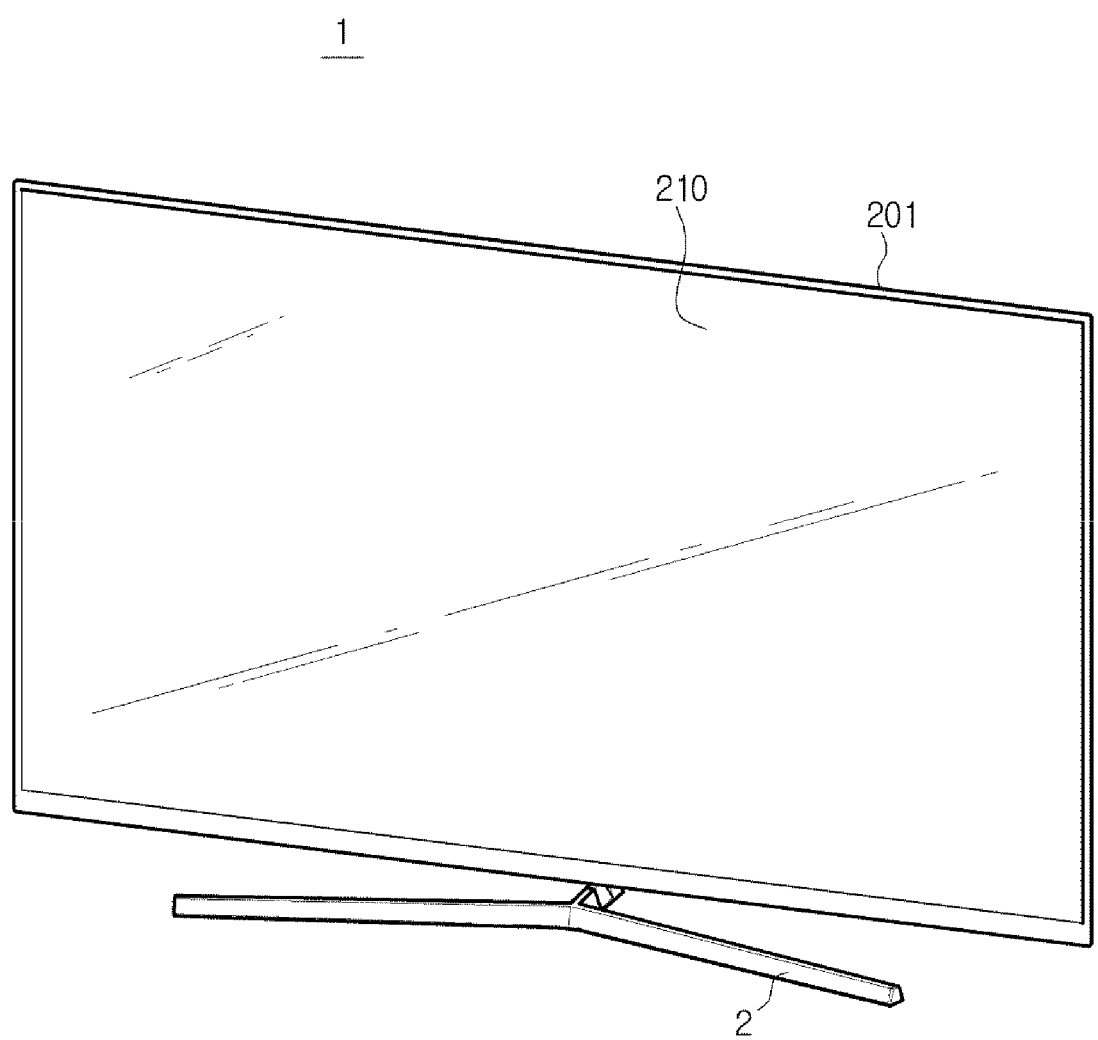
FIG. 1 is a diagram illustrating a display apparatus according to an example embodiment.

Hereinafter, example embodiments will be described in detail with reference to the accompanying drawings. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

The terms used in the present specification are used for the purpose of describing the example embodiments, and not for the purpose of limiting and/or restricting the present disclosure.

It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

Also, terms such as "front end," "rear end," "above," "below," "upper end," "lower end," and the like, which are used in the following description are defined based on example embodiments as shown in the drawings, but a shape and a position of each component are not limited thereto.

FIG. 1 illustrates a display apparatus according to an example embodiment.

A display apparatus 1 may be configured to display information, material, data, and the like in a form of a letter, a figure, a graph, an image, and the like. Examples of a display apparatus include a television, which is a long-distance communication medium for transmitting a moving image and an image signal, and a monitor, which is a type of computer output device.

The display apparatus 1 may be a flat display apparatus having a flat screen, as shown in FIG. 1, a curved display apparatus having a curved screen, or a bendable display apparatus having a bendable screen that may change from a flat surface to a curved surface, or vice versa.

The display apparatus 1 may include a display panel 210 configured to display an image and a backlight unit (BLU) 230 configured to supply light to the display panel 210.

The display apparatus 1 may further include a stand 2 configured to support the display apparatus 1 on an installation surface thereof. As shown in FIG. 1, the display apparatus 1 may be supported on a bottom surface. However, embodiments are not limited thereto. The display apparatus 1 may be, for example, attached to a wall or be installed in a wall in a built-in manner.

Figure 2:
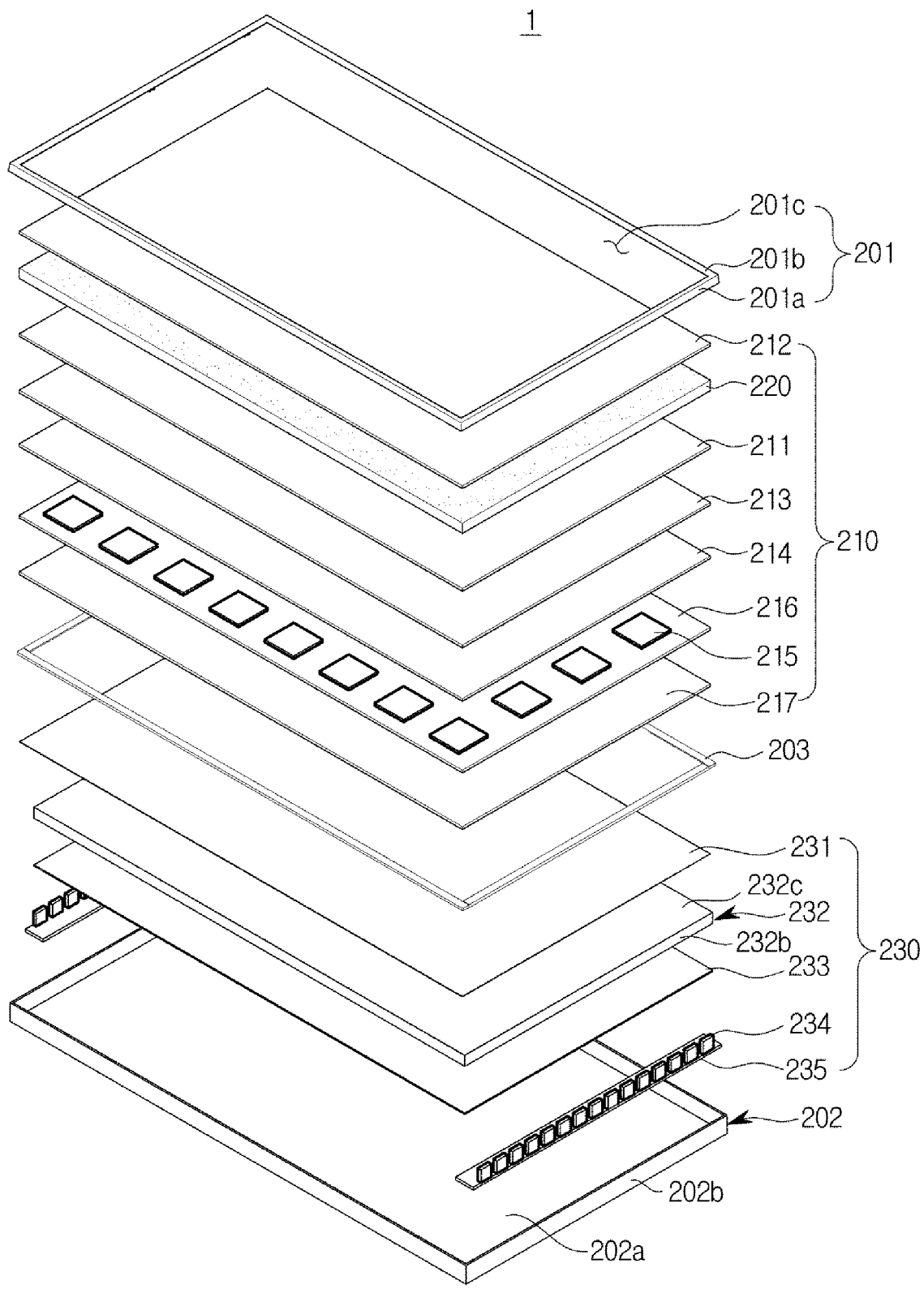
FIG. 2 is an exploded perspective view illustrating the display apparatus according to an example embodiment.
Figure 3:
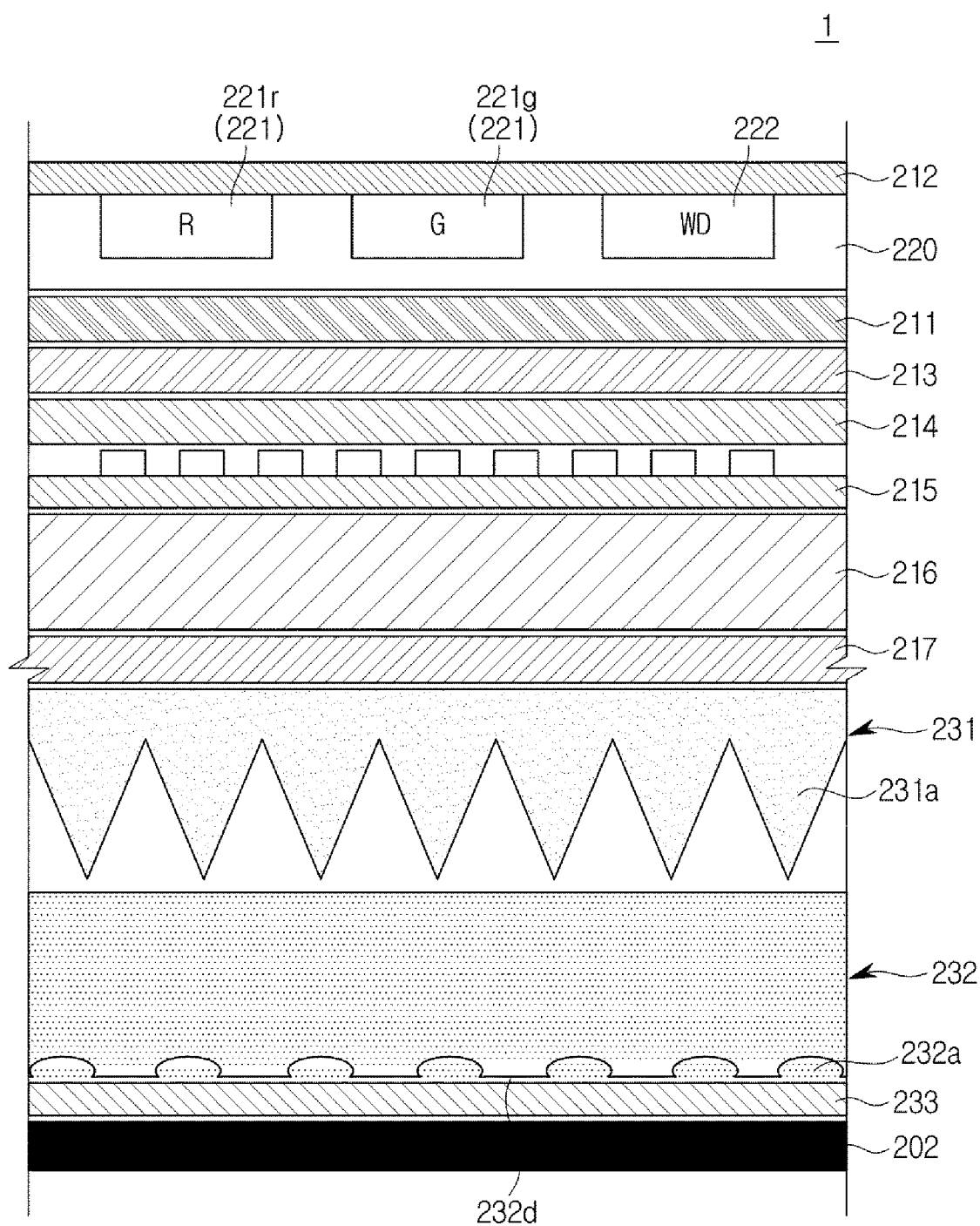
FIG. 3 is a cross-sectional view illustrating the display apparatus according to an example embodiment.

FIG. 2 is an exploded perspective view illustrating the display apparatus according to an example embodiment, and FIG. 3 is a cross-sectional view illustrating the display apparatus according to an example embodiment.

As shown in FIGS. 2 and 3, the display apparatus 1 may include a chassis assembly configured to accommodate and support the display panel 210 and the BLU 230.

The chassis assembly may include a top chassis 201, a middle mold 203, and a bottom chassis 202.

The top chassis 201 may include an opening 201c configured to externally expose the display panel 210, a bezel 201b configured to support an upper surface edge of the display panel 210, and a top chassis side part 201a extending in a downward direction from the bezel 201b.

The bottom chassis 202 may include a bottom surface 202a disposed below the BLU 230 and a bottom side part 202b extending in an upward direction from the bottom surface edges of the bottom surface 202a.

Various components, such as the top chassis 201, the middle mold 203, and the like, of the display apparatus 1 may be fixed to and supported by the bottom chassis 202.

The bottom chassis 202 may be configured to externally dissipate heat generated by a light source 234. That is, the heat generated by the light source 234 may be delivered to the bottom chassis 202 via a third substrate 235 and thereafter dissipated from the bottom chassis 202 externally. To externally dissipate heat, the bottom chassis 202 may be formed of various types of metal materials, such as aluminum, stainless steel (SUS), and the like, which have higher heat conductivity, or plastic materials such as an acrylonitrile-butadiene-styrene (ABS) resin, and the like. Also, the third substrate 235 may be configured with a metal printed circuit board (PCB) made of an aluminum material that has higher heat conductivity.

However, embodiments are not limited thereto. For example, at least one of the top chassis 201, the middle mold 203, and the bottom chassis 202 may be omitted, or the top chassis 201, the middle mold 203, and the bottom chassis 202 may be integrally formed.

The display apparatus 1 may further include a housing configured to enclose the chassis assembly, and protect and accommodate the chassis assembly.

The display apparatus 1 may further include the BLU 230 configured to supply light to the display panel 210.

According to an example embodiment, as shown in FIG. 2, the BLU 230 may be an edge-type BLU in which the light source 234 is disposed on an edge of at least one of a long side and a short side of the display panel 210. However, embodiments are not limited thereto. For example, the BLU 230 may be a direct-type BLU in which a light source 234 is disposed directly below the display panel 210.

The BLU 230 may include a light source module which is configured to include the light source 234 and a third substrate 235 on which the light source 234 is mounted, and various types of optical members, which are disposed on a propagation path of light emitted from the light source 234.

The light source 234 may be configured to supply light to the display panel 210. The light source 234 may include one or more light emitting diodes (LEDs). The LEDs may be configured in a form of a package which has one or more LED chips mounted on a substrate and is filled with resin. However, example embodiments are not limited thereto. For example, a cold cathode fluorescence lamp (CCFL) or an external electrode fluorescent lamp (EEFL) may be used as the light source 234.

The light source 234 may emit a predetermined color of light in various directions. According to an example embodiment, the predetermined color of light may include a blue light. The blue light refers to light that has a wavelength in a range of about 400 nm to 500 nm and visibly exhibits a blue color. The light source 234 may include a blue LED to emit the blue light.

A plurality of light sources 234 may be mounted on the third substrate 235 in a line along an edge of at least one of the long side and the short side of the display panel 210. A printed circuit may be disposed on the third substrate 235 to transmit driving power and a signal to the light source 234. The third substrate 235 may be disposed on the bottom chassis 202.

The optical members included in the BLU 230 may be disposed on the propagation path of light emitted from the light source 234 to guide a propagating direction of light or improve a characteristic thereof.

The optical members may include a light guide plate 232 configured to uniformly distribute light emitted from the light source 234 onto the display panel 210. The light guide plate 232 may be configured to guide light emitted from the light source 234 to the display panel 210.

The light guide plate 232 may be formed of, for example, a polymethyl methacrylate acrylate (PMMA) material. The light guide plate 232 may include a pattern 232a (see FIG. 6) which is configured to change the propagation path of light. In the edge type BLU 230 (see FIG. 2), the light source 234 may be disposed at a side surface of the light guide plate 232. Light that is incident on the side surface of the light guide plate 232 may be scattered by the pattern 232a, which is formed on a bottom surface of the light guide plate 232, and may be emitted through a top surface of the light guide plate 232. According to an example embodiment, the light guide plate 232 may include a light incident surface 232b on which light emitted from the light source 234 is incident and a light emitting surface 232c from which light incident on the light guide plate 232 is guided toward the display panel 210. Also, the light guide plate 232 may further include a light emitting corresponding surface 232d that opposite to the light emitting surface 232c of the light guide plate 232. The pattern 232a may be formed on the light emitting corresponding surface 232d to guide light incident on the light incident surface 232b of the light guide plate 232 to the light emitting surface 232c thereof. The pattern 232a may be in a form of a convex lens that is convex toward the light emitting surface 232c of the light guide plate 232.

The light guide plate 232 may be disposed on a reflective sheet 233. In consideration of thermal expansion, the light guide plate 232 may be disposed such that a side surface of the light guide plate 232 is separated by a predetermined distance from the light source 234.

The optical members may further include various types of optical sheets configured to improve one or more characteristics of light. The optical sheets may be disposed on the light guide plate 232 to improve the characteristics of light emitted from the light source 234 and guided through the light guide plate 232.

The optical sheets may include a diffuser sheet. Light that is guided through the light guide plate 232 may directly enter an eye of a viewer so that the pattern 232a of the light guide plate 232 is visible to the viewer. The diffuser sheet may be configured to offset, reduce, or minimize the visible pattern formed by the pattern 232a.

The optical sheets may further include a prism sheet 231. The prism sheet 231 may re-concentrate light, which has substantially decreased in brightness while passing through the diffuser sheet, to increase the brightness of the light. According to an example embodiment, the prism sheet 231 may be disposed on the light guide plate 232 to refract light that is guided through the light emitting surface 232c of the light guide plate 232. The prism sheet 231 may include a plurality of prisms 231a protruding toward the light emitting surface 232c of the light guide plate 232.

The optical sheets may further include a protective sheet configured to protect the optical sheets from an external impact or penetration of foreign materials.

As described above, according to an example embodiment, the optical sheets may be formed to include the diffuser sheet, the prism sheet 231, and the protective sheet. However, embodiments are not limited thereto, and one or more of the diffuser sheet, the prism sheet 231, and the protective sheet may be omitted, or sheets in addition to the diffuser sheet, the prism sheet 231, and the protective sheet may be included. Also, the optical sheets may be formed as a composite sheet combining functions of each of the sheets.

The optical sheet may further include the reflective sheet 233 configured to reflect light to reduce or prevent loss of light. The reflective sheet 233 may reflect light emitted from the light source 234 to enable the reflected light to be incident on the light emitting corresponding surface 232d of the light guide plate 232. The reflective sheet 233 may be in configured as, for example, a sheet, a film, a plate, and the like. According to an example embodiment, the reflective sheet 233 may be formed by coating a material with higher reflectance on a base metal. SUS, brass, aluminum, polyethylene terephthalate (PET), and the like may be used as the base metal, and silver, $TiO_2$, and the like may be used as a higher reflective coating material. The reflective sheet 233 may be disposed on and supported by the third substrate 235.

The display apparatus 1 may further include the display panel 210 configured to display an image.

The display panel 210 may include a liquid crystal layer 214. The liquid crystal layer 214 may display an image using liquid crystals that exhibit an optical property according to a variation in voltage and temperature. The liquid crystal layer 214 may be disposed between a first electrode 215 and a second electrode 213 and may include a plurality of liquid crystal molecules. The plurality of liquid crystal molecules may be arranged in a plurality of columns inside the liquid crystal layer 214, and may be aligned in a line in a predetermined direction or may be hectically twisted and arranged according to an electric field.

The display panel 210 may further include a first polarizer 217 provided to enable light passing through the optical sheets to be incident thereon. The middle mold 203 may be disposed between the optical sheets and the first polarizer 217. The backlight unit 230 may be fixed the middle mold 203 and the middle mold 203 may partition the display panel 210 from the backlight unit 230.

The first polarizer 217 may polarize light emitted from the light source 234 and incident on a first substrate 216 to enable only the polarized light, which oscillates in the same direction as a predetermined polarization axis, to be incident on the first substrate 216. One surface of the first polarizer 217 may be disposed to be in contact with the first substrate 216 or, the first polarizer 217 may be disposed near the first substrate 216. The first polarizer 217 may be formed as a film. The first polarizer 217 may include, for example, a vertical polarizer or a horizontal polarizer.

The display panel 210 may further include the first substrate 216. The first substrate 216 may be disposed on the first polarizer 217. The first electrode 215 may be installed on one surface of the first substrate 216. For example, the first electrode 215 may be installed on an upper surface of the first substrate 216 which faces the liquid crystal layer 214. The first substrate 216 may include a transparent material to enable light passing through the first polarizer 217 to pass through the first substrate 216. According to an example embodiment, the first substrate 216 may be formed using a synthetic resin, such as an acryl resin and the like, glass, or the like. The first substrate 216 may be configured in a form of a flexible PCB (FPCB).

In association with the second electrode 213 (which will be described below), the first electrode 215 may apply current to the liquid crystal layer 214 to adjust an orientation of the plurality of liquid crystal molecules inside the liquid crystal layer 214. According to the orientation of the plurality of liquid crystal molecules, the display panel 210 may output a variety of images.

The first electrode 215 may be implemented using a thin film transistor (TFT). The first electrode 215 may be connected to an external power source to receive power therefrom. A plurality of first electrodes 215 may be disposed on the first substrate 216.

The display panel 210 may further include the second electrode 213. The second electrode 213 may be disposed to face the first electrode 215 with the liquid crystal layer 214 interposed therebetween. In association with the first electrode 215, the second electrode 213 may apply a current to the liquid crystal layer 214. A second polarizer 211 may be disposed on the second electrode 213. In other words, the second electrode 213 may be disposed between the second polarizer 211 and the liquid crystal layer 214. The second electrode 213 may be a common electrode.

The display panel 210 may further include a quantum dot (QD) color filter 220. The QD color filter 220 may output a predetermined color of incident light by converting the predetermined color into a different color, or the QD color filter may not perform such color conversion. When incident light on the QD filter is blue light, the QD color filter 220 may transmit and output a blue light, or may convert the incident blue light and output a red light or a green light. The display panel 210 may emit various colors of light externally by color conversion of light by the QD color filter 220, and thus, the display apparatus 1 may display images including various colors.

Figure 4:
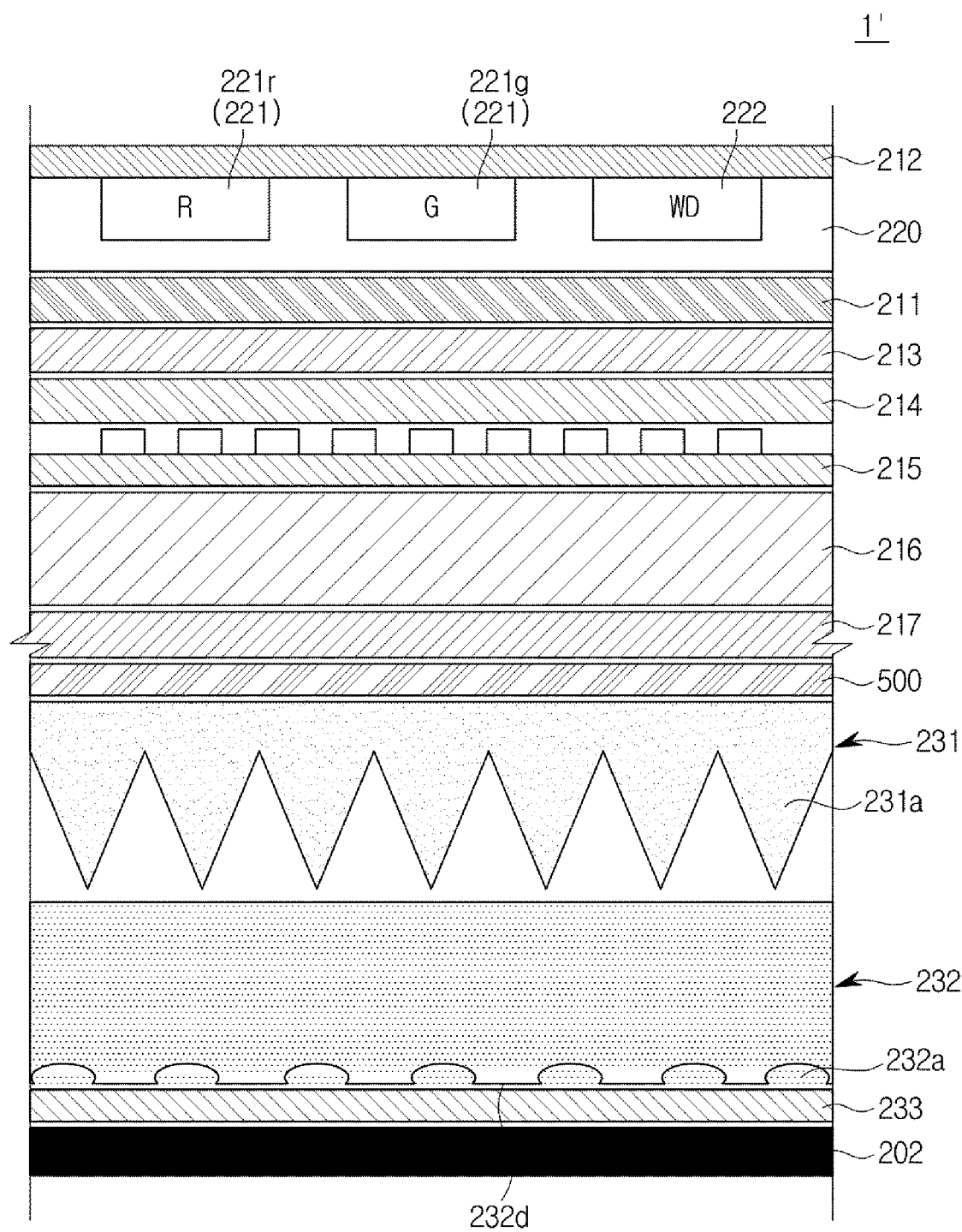
FIG. 4 is a cross-sectional view illustrating a display apparatus according to another example embodiment.

According to an example embodiment, as shown in FIG. 3 and FIG. 4, the QD color filter 220 may include a QD converter 221 and a light transmitting part 222.

The light source 234 may generate light and emit the generated light to both the QD converter 221 and the light transmitting part 222. The light source 234 may generate light having intensity or brightness corresponding to externally applied power and may emit the generated light toward the QD converter 221 and the light transmitting part 222. Light generated from the light source 234 may be reflected by a separate reflector, a separate aperture, or the like, to be emitted toward the QD converter 221 and the light transmitting part 222.

Blue color light incident on the QD converter 221 may be converted into red or green light and may be emitted externally. Blue color light incident on the light transmitting part 222 may be scattered thereinside and may be output externally.

The QD converter 221 may convert a color of light emitted from the light source 234 into a different color of light using a QD and output the converted color light. For example, the QD converter 221 may convert blue light incident thereon into a red or green light and output red or green light.

The QD converter 221 may include a red QD element 221r and a green QD element 221g. The QD converter 221 may include one or more red QD elements 221r and one or more green QD elements 221g. When blue light is incident on the red QD element 221r, the red QD element 221r may convert the color of the incident blue light and may emit a red light according to a quantum confinement effect. The red QD element 221r may include a plurality of QDs, and a size of each of the plurality of QDs inside the red QD element 221r may be relatively greater than that of each of a plurality of QDs inside the green QD element 221g.

When blue light is incident on the green QD element 221g, the green QD element 221g may convert the incident blue light and may emit green light having a wavelength that is longer than that of the blue light. The green QD element 221g may include a plurality of QDs, and a size of each of the plurality of QDs inside the green QD element 221g may be relatively less than that of each of the plurality of QDs inside the red QD element 221r.

The light transmitting part 222 may transmit light emitted from the light source 234 without converting the color of the incident light. Therefore, when blue light is incident on the light transmitting part 222, the light transmitting part 222 emits blue light which has the same blue color as light incident thereon.

The light transmitting part 222 may be implemented in a form of a white diffuser.

The QD color filter 220 may be disposed between the second polarizer 211 and a second substrate 212.

The display panel 210 may further include the second substrate 212. The second substrate 212 may be disposed on the QD color filter 220. The second substrate 212 may be implemented with a transparent material to enable red, green, and blue light, which are emitted from the QD color filter 220, to pass through the second substrate 212. According to an example embodiment, the second substrate 212 may be implemented with a synthetic resin, such as an acryl resin, glass, or the like.

The display panel 210 may further include the second polarizer 211. The second polarizer 211 may be disposed on the second electrode 213 to polarize light incident on the second polarizer 211. Light passing through and emitted from the second electrode 213 may be incident on the second polarizer 211, and light may pass through the second polarizer 211 or may be blocked by the second polarizer 211 according to an oscillating direction thereof.

A polarization axis of the second polarizer 211 may be perpendicular to that of the first polarizer 217. For example, when the first polarizer 217 is a vertical polarizer, the second polarizer 211 may be a horizontal polarizer.

When the polarization axis of the second polarizer 211 is perpendicular to that of the first polarizer 217 and the plurality of liquid crystal molecules of the liquid crystal layer 214 are aligned in a line in a predetermined direction to transmit light passing through the first polarizer 217, an oscillating direction of light passing through the first polarizer 217 may not change, and thus, light may not be able to pass through the second polarizer 211. Consequently, light passing through the second electrode 213 may not be emitted externally. When the plurality of liquid crystal molecules of the liquid crystal layer 214 are aligned in a helical form to transmit light passing through the first polarizer 217, an oscillating direction of light passing through the first polarizer 217 may change, and thus, light may pass through the second polarizer 211. Consequently, light passing through the second electrode 213 may be emitted externally.

While at least one of red light, a green light, and a blue light is being emitted externally, the colors of light may be combined or not combined to exhibit a predetermined color. The display apparatus 1 may display an image using at least one of such red light, green light, and blue light.

FIG. 4 is a cross-sectional view illustrating a display apparatus 1' according to another example embodiment. Hereinafter, descriptions overlapping with those in FIG. 2 and FIG. 3 will be omitted.

As shown in FIG. 4, the display apparatus 1' may further include a reflective polarizer 500. The reflective polarizer 500 may be disposed to increase brightness of light emitted from the light source 234. The reflective polarizer 500 may be disposed between the first polarizer 217 and the prism sheet 231. The reflective polarizer 500 may be configured with, for example, a dual brightness enhancement film (DBEF) sheet.

Figure 5:
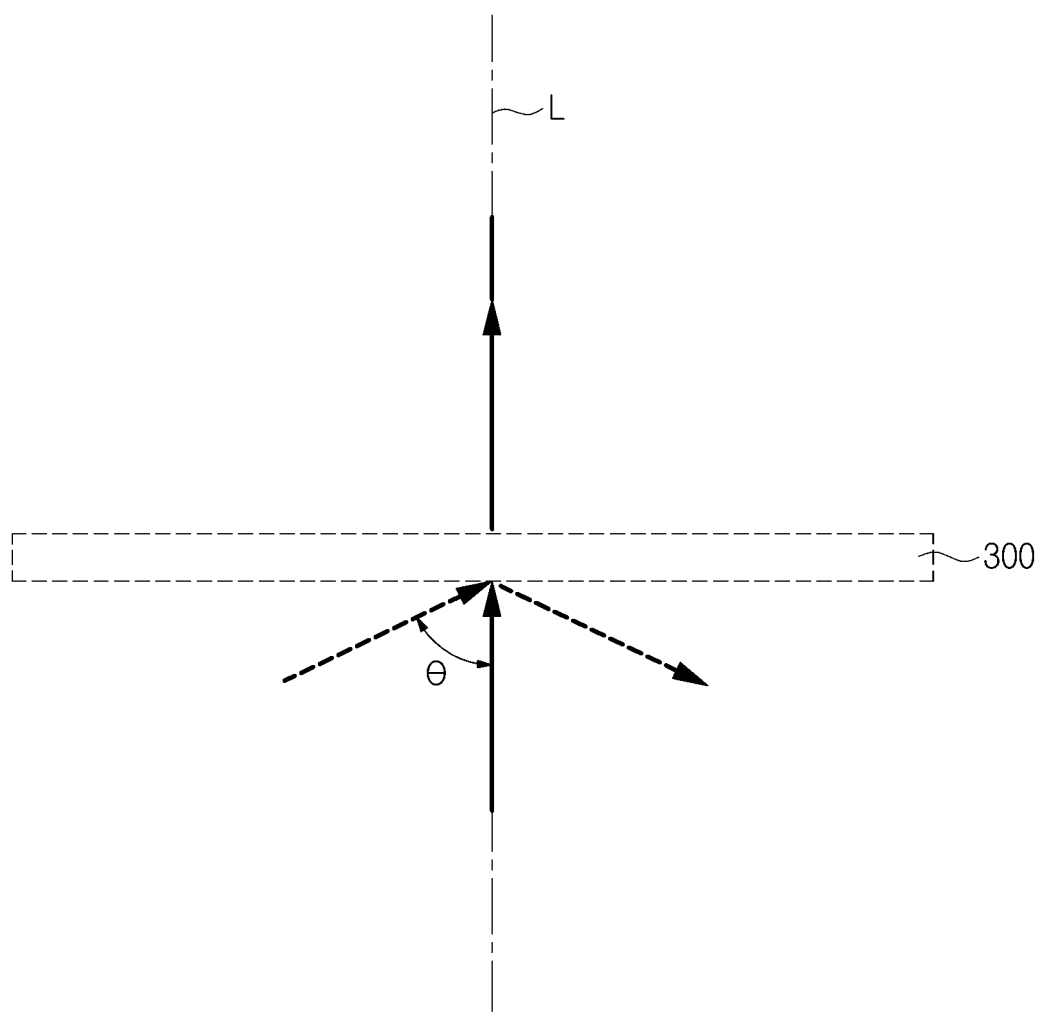
FIG. 5 is a diagram illustrating a characteristic of a dichroic filter in the display apparatus according to an example embodiment.

FIG. 5 is a diagram illustrating a characteristic of a dichroic filter in the display apparatus according to an example embodiment.

The display apparatus 1 as shown in FIG. 1 may further include a dichroic filter 300 which may be configured to improve a concentration of light emitted from the light source 234.

The dichroic filter 300 is a filter that selects a wavelength of light to transmit or reflect. The dichroic filter 300 may include a plurality of layers which each have a different refractive index. Particularly, the dichroic filter 300 may have a structure in which a layer having a higher refractive index and a layer having a lower refractive index are alternately disposed.

As shown in FIG. 5, the dichroic filter 300 may be configured to transmit light that is incident on the dichroic filter 300 with a narrow angle based on a reference light incidence line L, and to reflect light that is incident on the dichroic filter 300 with a large angle based on the reference light incidence line L. The reference light incidence line L may be an imaginary line that extends in a thickness direction normal to the surface of the display apparatus 1 or in a direction in which the top chassis 201 and the bottom chassis 202 are coupled.

According to an example embodiment, a wavelength of light, which is incident on the dichroic filter 300 with an incidence angle of zero degrees based on the reference light incidence line L and has a transmittance of 50%, may be in a range of 480 nm to 530 nm for the light source 234 to emit blue light.

Generally, the display apparatus 1 including the liquid crystal layer 214 may have a higher transmittance of light at a side surface of the display apparatus 1 compared to a front surface of the display apparatus 1 due to a characteristic of the liquid crystal layer 214, and thus, black light intensity may increase toward the side surface of the display apparatus 1 in a black mode. Such difference in light transmittance may cause an imbalance in a contrast ratio on the front surface of the display apparatus 1. Here, the black mode refers to a configuration in which light passes through the display apparatus 1 in a state in which power is supplied to a TFT substrate, and the black light intensity refers to intensity of light that passes through the display apparatus 1 to exit therefrom. The above-described problem may be resolved by concentrating light emitted from the light source 234 on the front surface of the display apparatus 1 by using the dichroic filter 300. That is, the dichroic filter 300 may concentrate light on the front surface of the display apparatus 1, at which the black light intensity is relatively low, to reduce or minimize a difference in brightness of light between the front surface and the side surface of the display apparatus 1.

Hereinafter, example embodiments of the dichroic filter 300 will be described.

Figure 12:
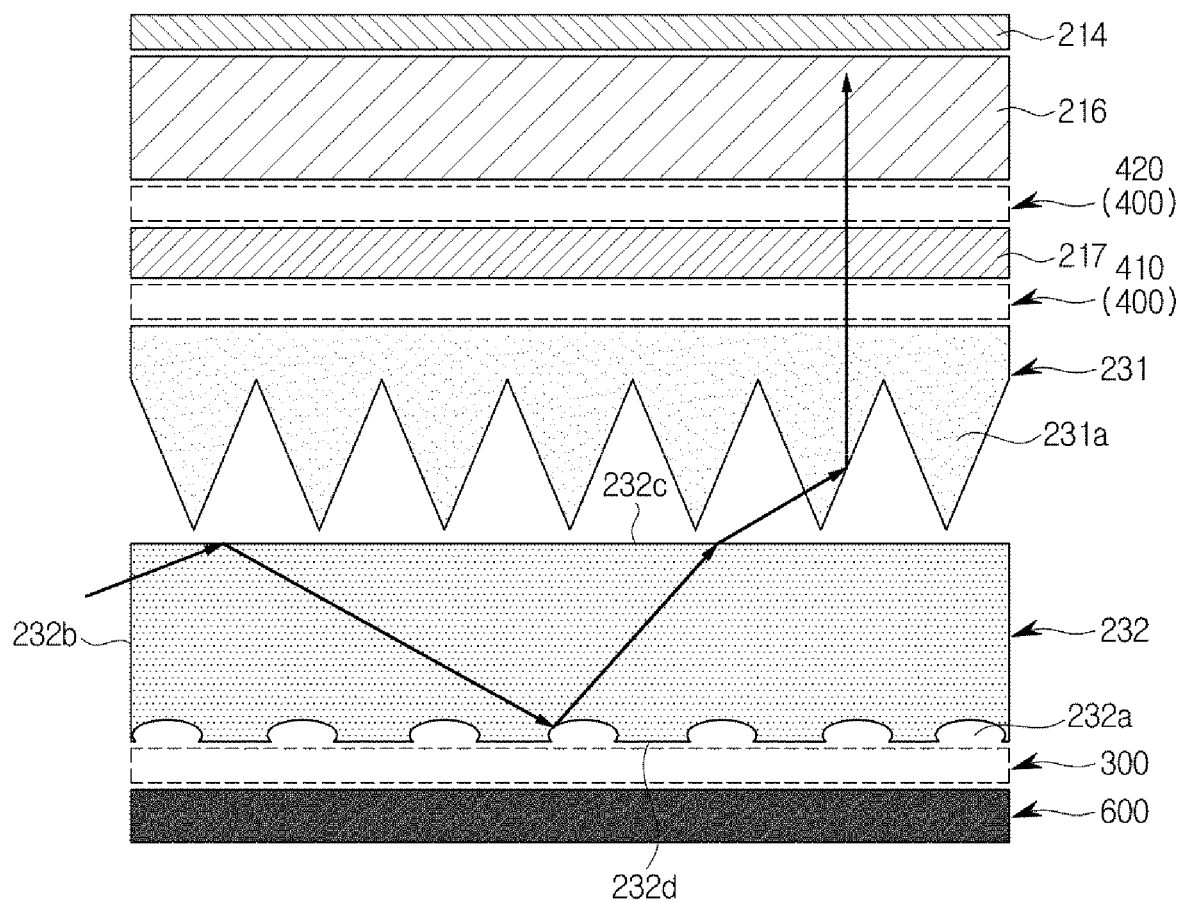
FIG. 12 is a diagram illustrating an example structure in which the dichroic filter is included in the display apparatus according to an example embodiment.
Figure 23:
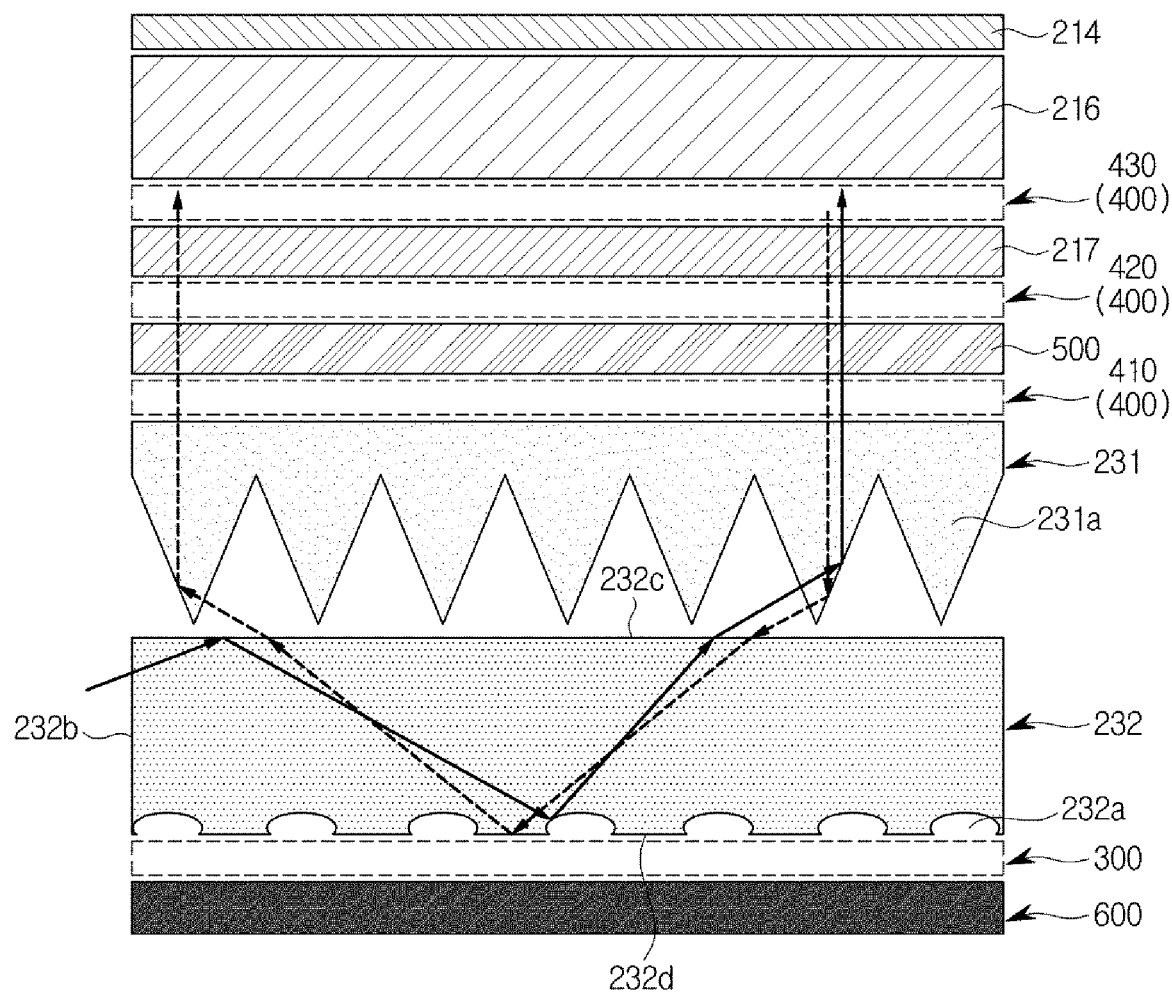
FIG. 23 is a diagram illustrating an example structure in which the reflective polarizer and the dichroic filter are included in the display apparatus according to an example embodiment.

For reference, example propagation paths of light are schematically illustrated in FIG. 12 and FIG. 23.

Figure 6:
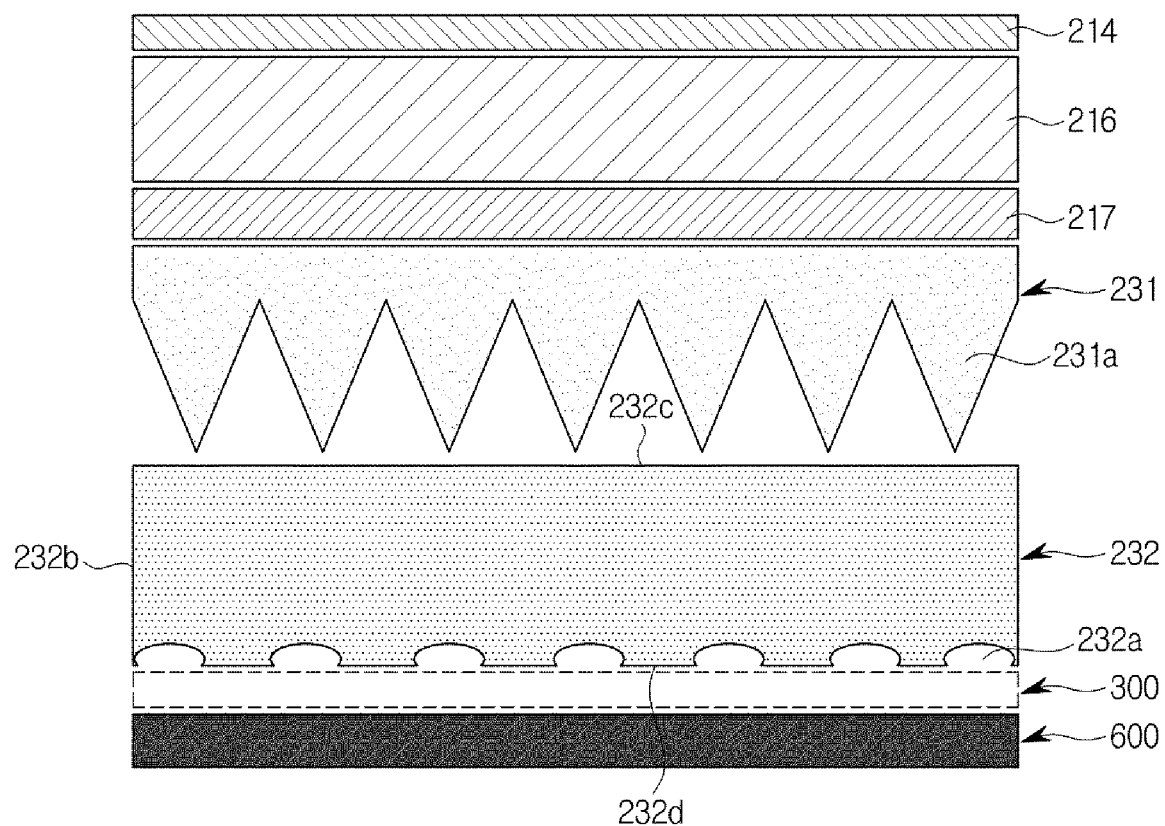
FIG. 6 is a diagram illustrating an example structure in which the dichroic filter is included in the display apparatus according to an example embodiment.
Figure 7:
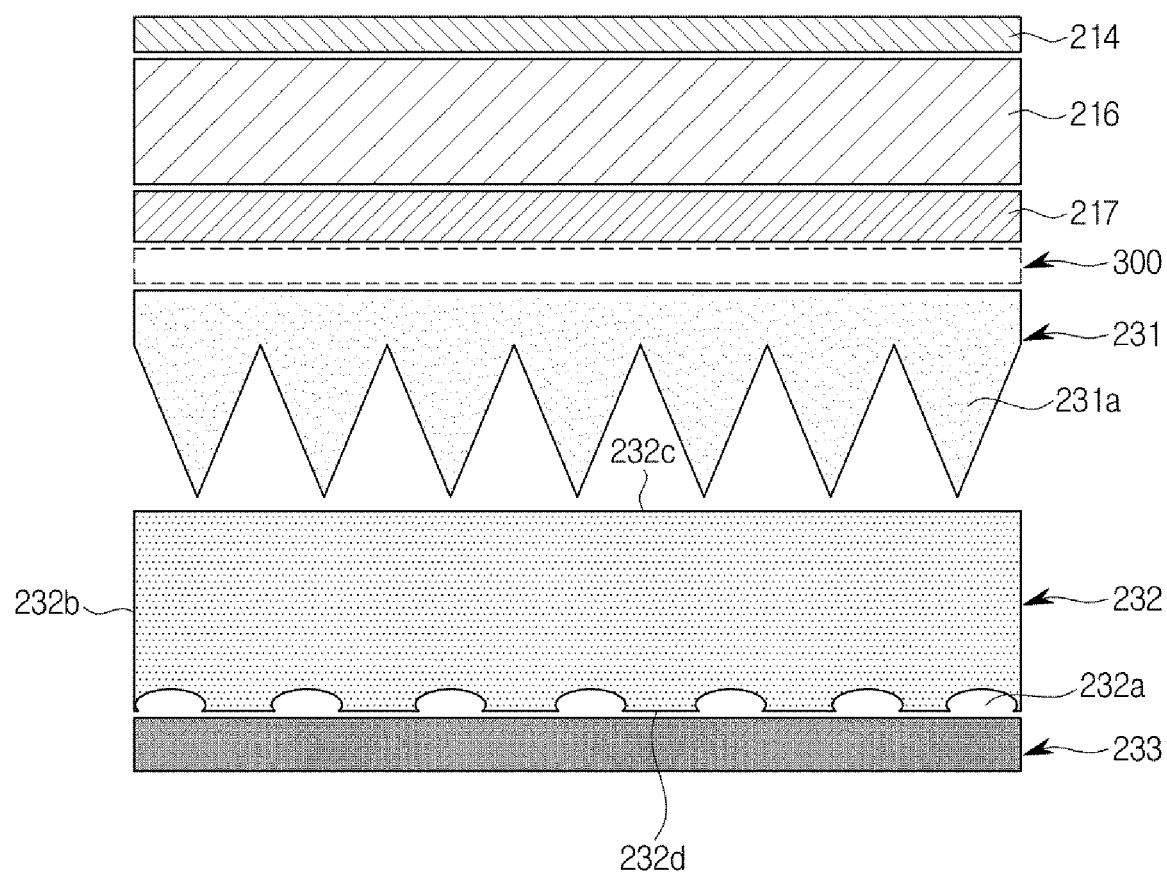
FIG. 7 is a diagram illustrating an example structure in which the dichroic filter is included in the display apparatus according to an example embodiment.
Figure 8:
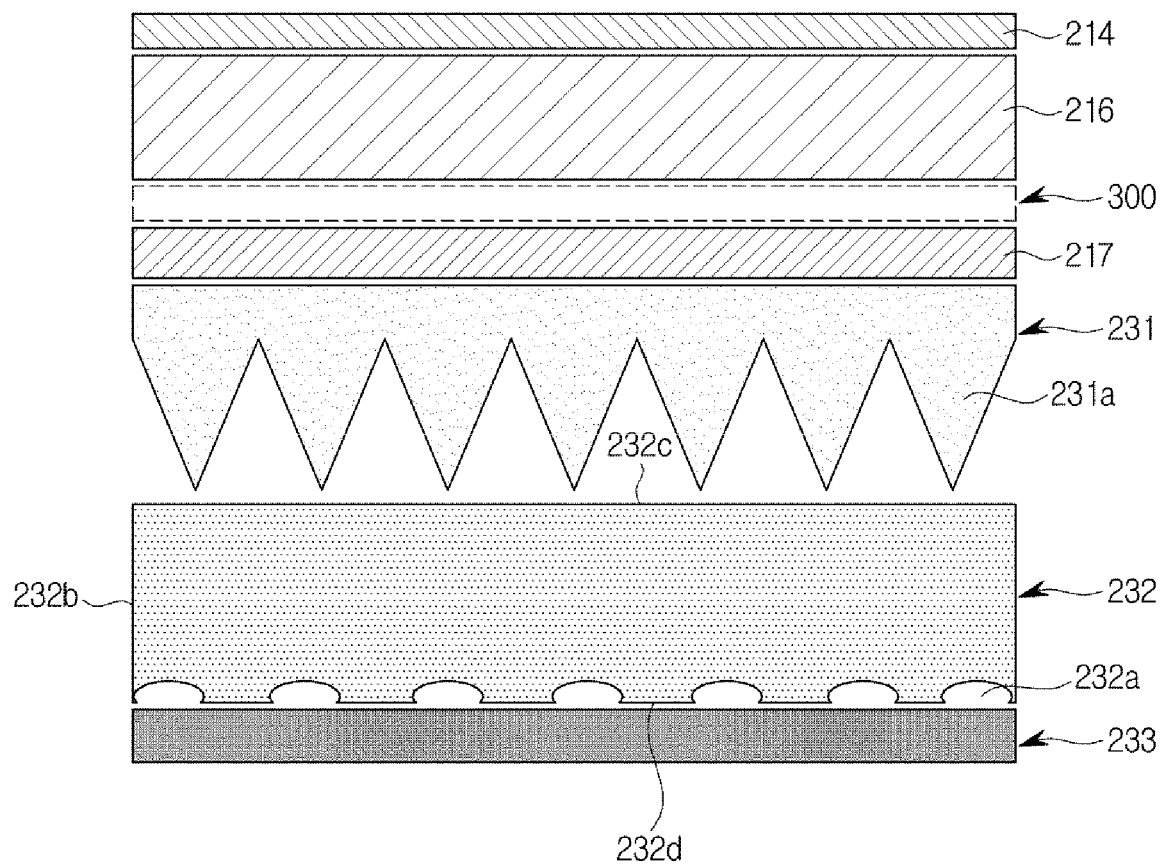
FIG. 8 is a diagram illustrating an example structure in which the dichroic filter is included in the display apparatus according to an example embodiment.

FIG. 6, FIG. 7, and FIG. 8 illustrate diagrams of example structures in which a dichroic filter is included in the display apparatus according to example embodiments. Hereinafter, descriptions overlapping with those in FIG. 1 to FIG. 3, and FIG. 5 will be omitted.

According to an example embodiment, the display apparatus 1 may include at least one dichroic filter 300. In FIG. 6 to FIG. 8, example embodiments in which a single dichroic filter 300 is disposed will be described.

As shown in FIG. 6, the display apparatus 1 may include the dichroic filter 300 disposed below the light guide plate 232 to improve concentration of light emitted from the light source 234. The dichroic filter 300 may be disposed below the light guide plate 232 to directly face the light emitting corresponding surface 232d of the light guide plate 232. When the dichroic filter 300 is disposed below the light guide plate 232, the reflective sheet 233 may be omitted.

As shown in FIG. 6, when the dichroic filter 300 replaces the reflective sheet 233, the display apparatus 1 may further include an absorbing member 600 disposed below the dichroic filter 300 to absorb light passing through the dichroic filter 300. The absorbing member 600 may be disposed on the bottom surface 202a of the bottom chassis 202 (see FIG. 2), and the absorbing member 600 may include a black film.

As shown in FIG. 7, the dichroic filter 300 may be disposed between the prism sheet 231 and the first polarizer 217, and instead of the absorbing member 600 as shown in FIG. 6, the reflective sheet 233 may be disposed below the light guide plate 232.

As shown in FIG. 8, the dichroic filter 300 may be disposed between the first polarizer 217 and the first substrate 216, and instead of the absorbing member 600 as shown in FIG. 6, the reflective sheet 233 may be disposed below the light guide plate 232.

Figure 9:
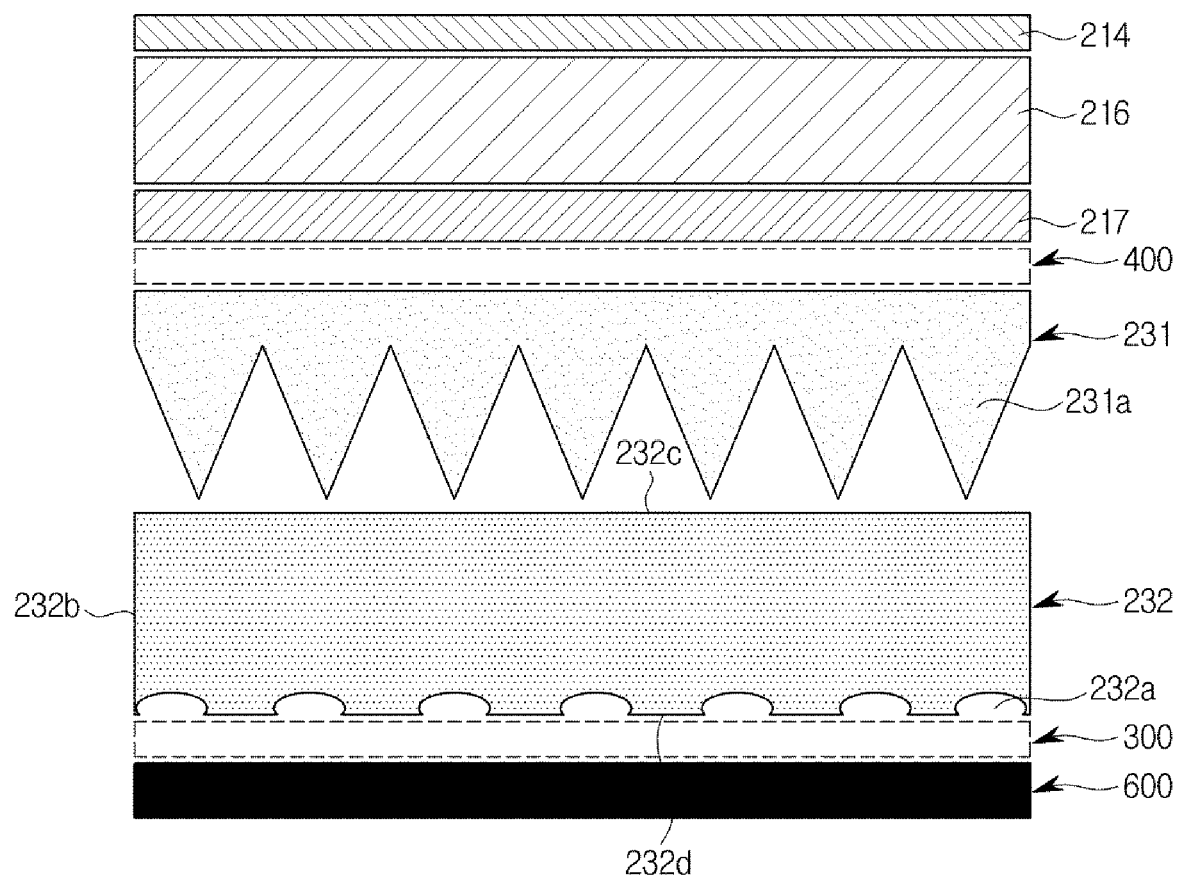
FIG. 9 is a diagram illustrating an example structure in which the dichroic filter is included in the display apparatus according to an example embodiment.
Figure 10:
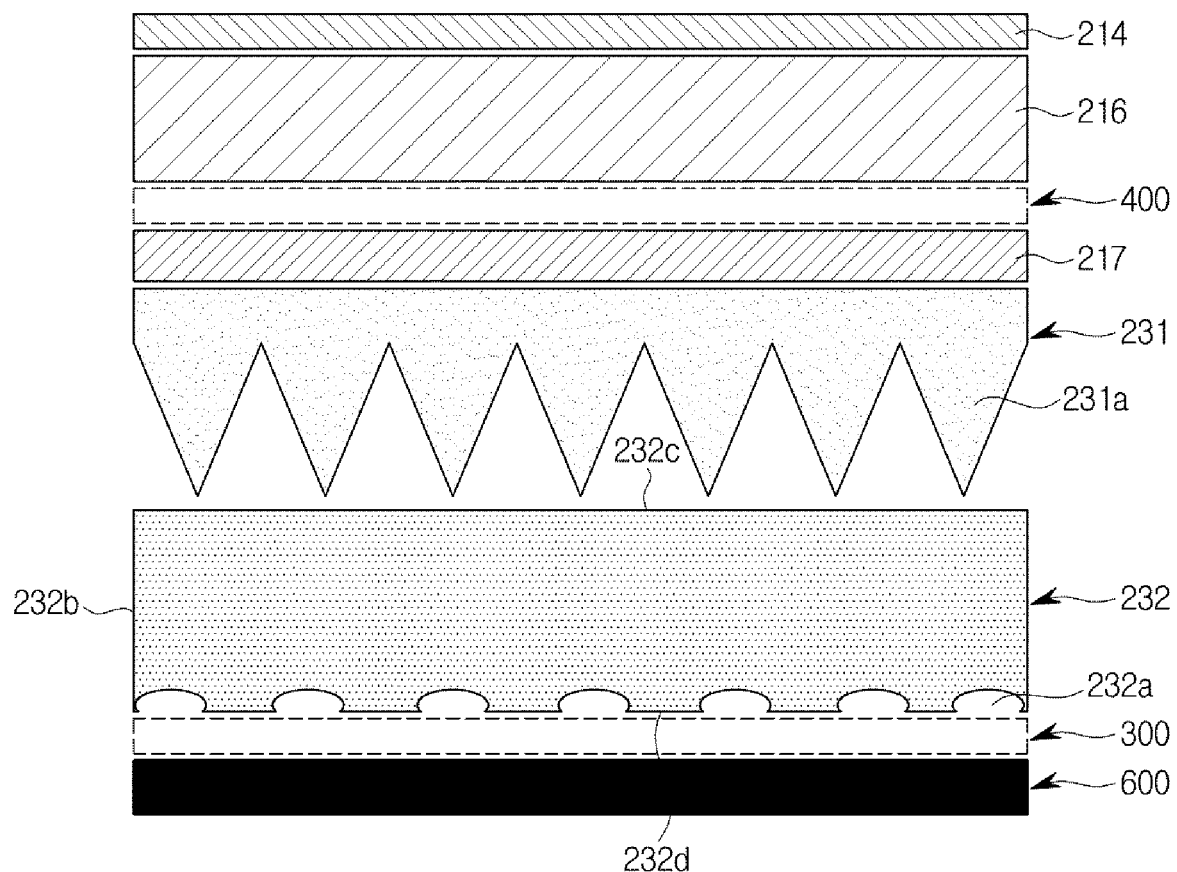
FIG. 10 is a diagram illustrating an example structure in which the dichroic filter is included in the display apparatus according to an example embodiment.
Figure 11:
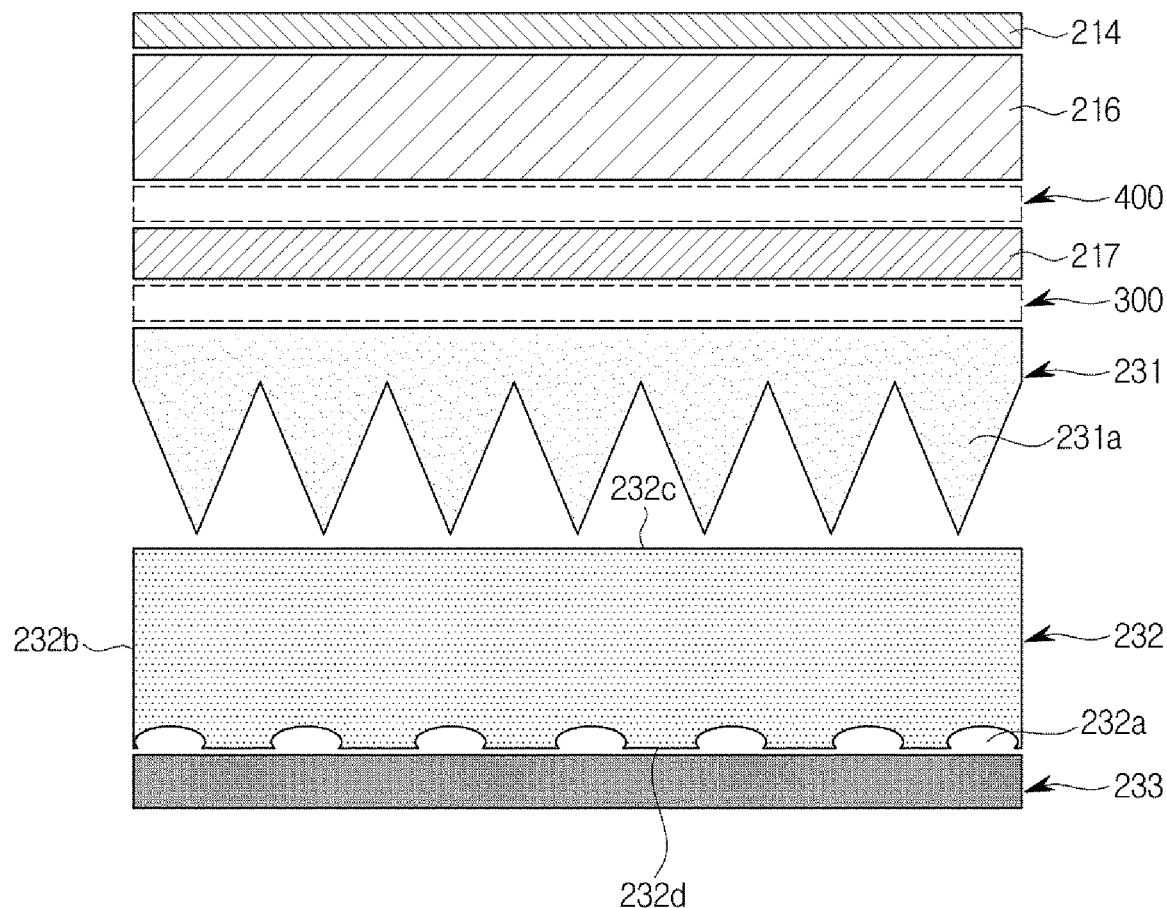
FIG. 11 is a diagram illustrating an example structure in which the dichroic filter is included in the display apparatus according to an example embodiment.

FIG. 9, FIG. 10, and FIG. 11 illustrate diagrams of example structures in which a dichroic filter is included in the display apparatus 1 according to example embodiments. Hereinafter, descriptions overlapping with those in FIG. 1 to FIG. 3, and FIG. 5 will be omitted.

According to an example embodiment, the display apparatus 1 may include at least one dichroic filter 300. In FIG. 9 to FIG. 11, example embodiments in which two dichroic filters 300 and 400 are disposed will be described.

As shown in FIG. 9, the display apparatus 1 may include the dichroic filter 300 disposed below the light guide plate 232 to improve concentration of light emitted from the light source 234. The display apparatus 1 may further include an additional dichroic filter 400 disposed between the first polarizer 217 and the prism sheet 231 to improve concentration of light emitted from the light source 234 in association with the dichroic filter 300. When the dichroic filter 300 is disposed below the light guide plate 232, the reflective sheet 233 may be omitted.

As shown in FIG. 9, when the dichroic filter 300 replaces the reflective sheet 233, the display apparatus 1 may further include the absorbing member 600 disposed below the dichroic filter 300.

As shown in FIG. 10, the display apparatus 1 may include the dichroic filter 300 disposed below the light guide plate 232 to improve concentration of light emitted from the light source 234. The display apparatus 1 may further include an additional dichroic filter 400 disposed between the first polarizer 217 and the first substrate 216 to improve concentration of light emitted from the light source 234 in association with the dichroic filter 300. When the dichroic filter 300 is disposed below the light guide plate 232, the reflective sheet 233 may be omitted.

As shown in FIG. 10, when the dichroic filter 300 replaces the reflective sheet 233, the display apparatus 1 may further include the absorbing member 600 disposed below the dichroic filter 300.

As shown in FIG. 11, the display apparatus 1 may include the dichroic filter 300 disposed between the prism sheet 231 and the first polarizer 217 to improve concentration of light emitted from the light source 234. Also, the display apparatus 1 may further include the additional dichroic filter 400 disposed between the first polarizer 217 and the first substrate 216 to improve concentration of light emitted from the light source 234 in association with the dichroic filter 300. The reflective sheet 233 may be disposed below the light guide plate 232, replacing the absorbing member 600.

FIG. 12 is a diagram illustrating a display apparatus including a dichroic filter according to an example embodiment. Hereinafter, descriptions overlapping with those in FIG. 1 to FIG. 3, and FIG. 5 will be omitted.

The display apparatus 1 may include at least one dichroic filter 300. In FIG. 12, an example embodiment in which three dichroic filters 300, 410, and 420 are disposed will be described.

As shown in FIG. 12, the display apparatus 1 may include the dichroic filter 300 disposed below the light guide plate 232 to improve concentration of light emitted from the light source 234. The display apparatus 1 may further include at least one additional dichroic filter 400 disposed above the light guide plate 232 to improve concentration of light emitted from the light source 234 in association with the dichroic filter 300. The at least one additional dichroic filter 400 may include a first additional dichroic filter 410 disposed between the first polarizer 217 and the prism sheet 231. The at least one additional dichroic filter 400 may further include a second additional dichroic filter 420 disposed between the first polarizer 217 and the first substrate 216. When the dichroic filter 300 is disposed below the light guide plate 232, the reflective sheet 233 may be omitted.

As shown in FIG. 12, when the dichroic filter 300 replaces the reflective sheet 233, the display apparatus 1 may further include the absorbing member 600 disposed below the dichroic filter 300.

FIG. 13, FIG. 14, FIG. 15, and FIG. 16 illustrate diagrams of example structures in which a reflective polarizer and a dichroic filter are included in the display apparatus according to example embodiments. Hereinafter, descriptions overlapping with those in FIG. 1 to FIG. 5 will be omitted.

The display apparatus 1 may further include the reflective polarizer 500. The reflective polarizer 500 may be disposed to complement at least one of the first polarizer 217 and the second polarizer 211. Also, the reflective polarizer 500 may be disposed to improve energy efficiency of the display apparatus 1. The energy efficiency of the display apparatus 1 may be determined by a total amount of light emitted from the light source 234 with respect to power consumption. The reflective polarizer 500 may be disposed between the first polarizer 217 and the prism sheet 231. The reflective polarizer 500 may be configured, for example, with a dual brightness enhancement film (DBEF) sheet.

The display apparatus 1 may include at least one dichroic filter 300. When the reflective polarizer 500 is included in the display apparatus 1, the concentration of light may be degraded. The dichroic filter 300 may reduce or prevent degradation of concentration of light due to the inclusion of the reflective polarizer 500 in the display apparatus 1. In FIG. 13 to FIG. 16, example embodiments of a display apparatus 1 including a single dichroic filter 300 will be described.

Figure 13:
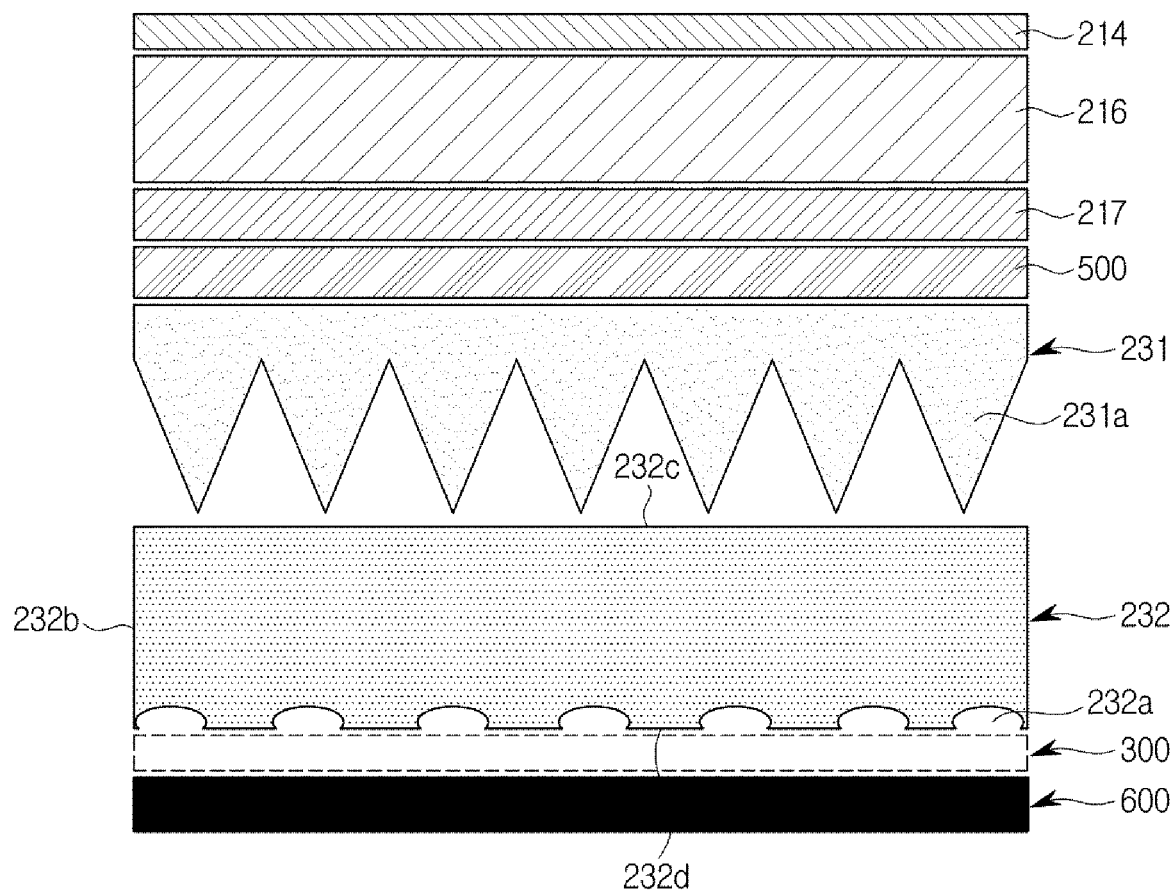
FIG. 13 is a diagram illustrating an example structure in which a reflective polarizer and the dichroic filter are included in the display apparatus according to an example embodiment.

As shown in FIG. 13, the display apparatus 1 may include the dichroic filter 300 disposed below the light guide plate 232 to improve concentration of light emitted from the light source 234. The dichroic filter 300 may be disposed below the light guide plate 232 to directly face the light emitting corresponding surface 232d of the light guide plate 232. When the dichroic filter 300 is disposed below the light guide plate 232, the dichroic filter 300 may replace the reflective sheet 233, and the reflective sheet 233 may be omitted.

As shown in FIG. 13, when the dichroic filter 300 replaces the reflective sheet 233, the display apparatus 1 may further include the absorbing member 600 disposed below the dichroic filter 300 to absorb light passing through the dichroic filter 300.

Figure 14:
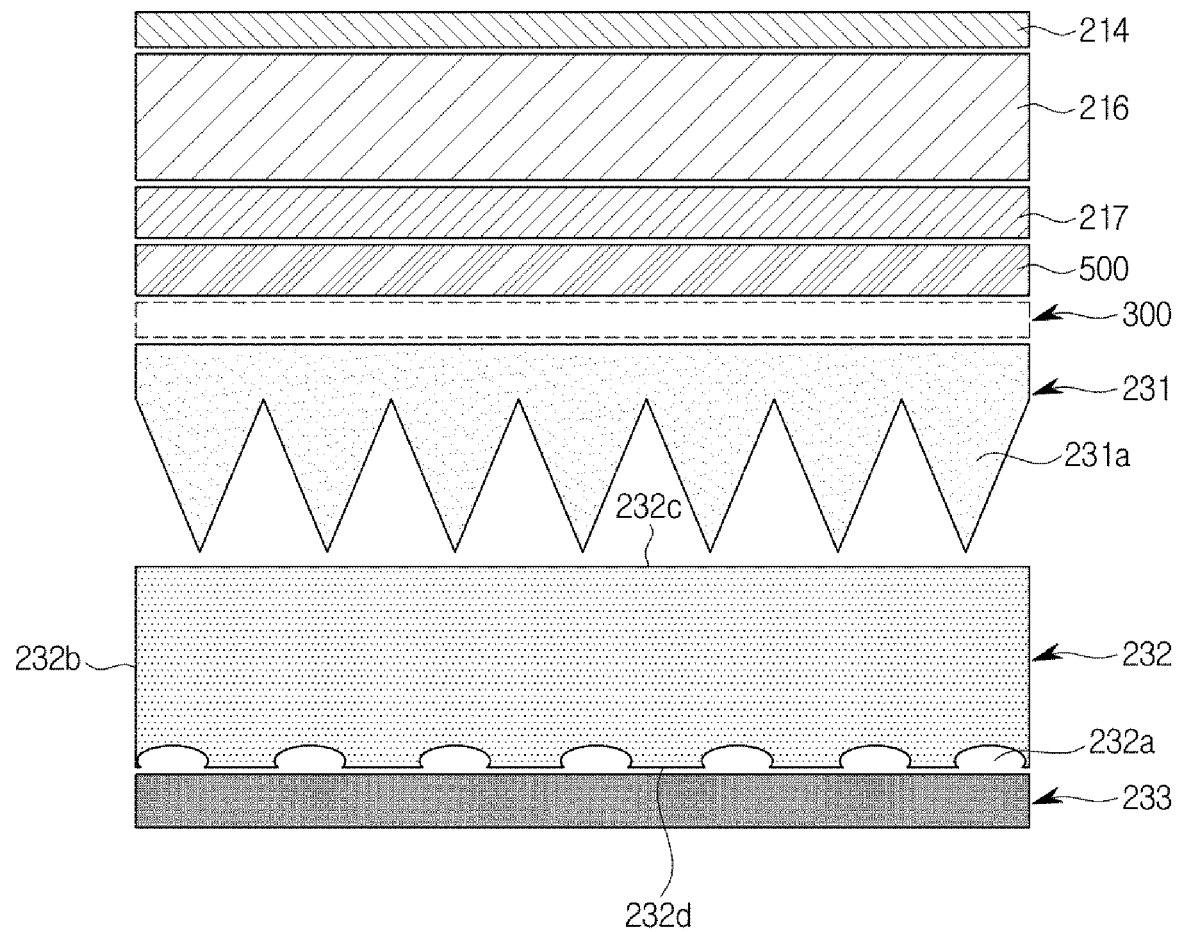
FIG. 14 is a diagram illustrating an example structure in which the reflective polarizer and the dichroic filter are included in the display apparatus according to an example embodiment.

As shown in FIG. 14, the display apparatus 1 may include the dichroic filter 300 disposed between the prism sheet 231 and the reflective polarizer 500 to improve concentration of light emitted from the light source 234. The reflective sheet 233 may be disposed below the light guide plate 232, replacing the absorbing member 600, and the absorbing member 600 may be omitted.

Figure 15:
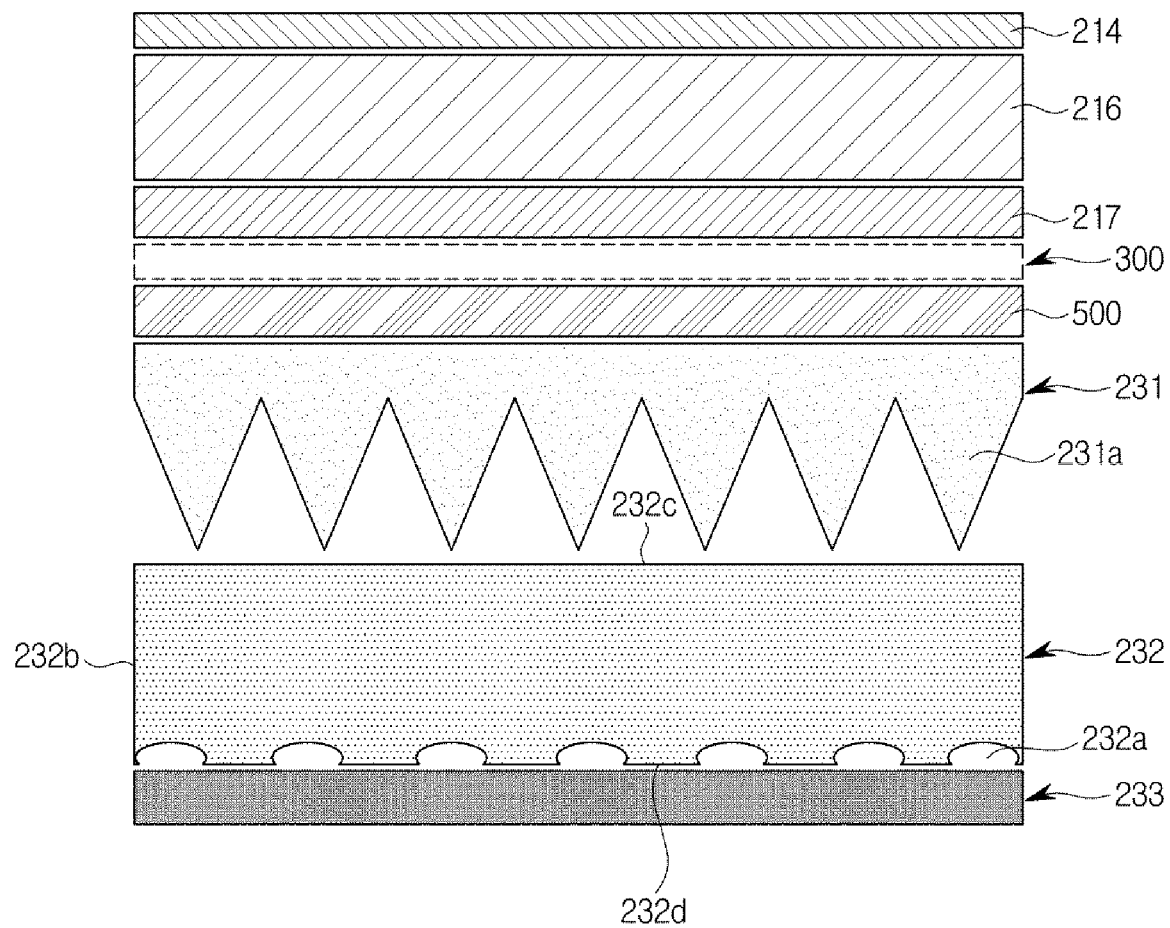
FIG. 15 is a diagram illustrating an example structure in which the reflective polarizer and the dichroic filter are included in the display apparatus according to an example embodiment.

As shown in FIG. 15, the display apparatus 1 may include the dichroic filter 300 disposed between the reflective polarizer 500 and the first polarizer 217 to improve concentration of light emitted from the light source 234. The reflective sheet 233 may be disposed below the light guide plate 232, replacing the absorbing member 600, and the absorbing member 600 may be omitted.

Figure 16:
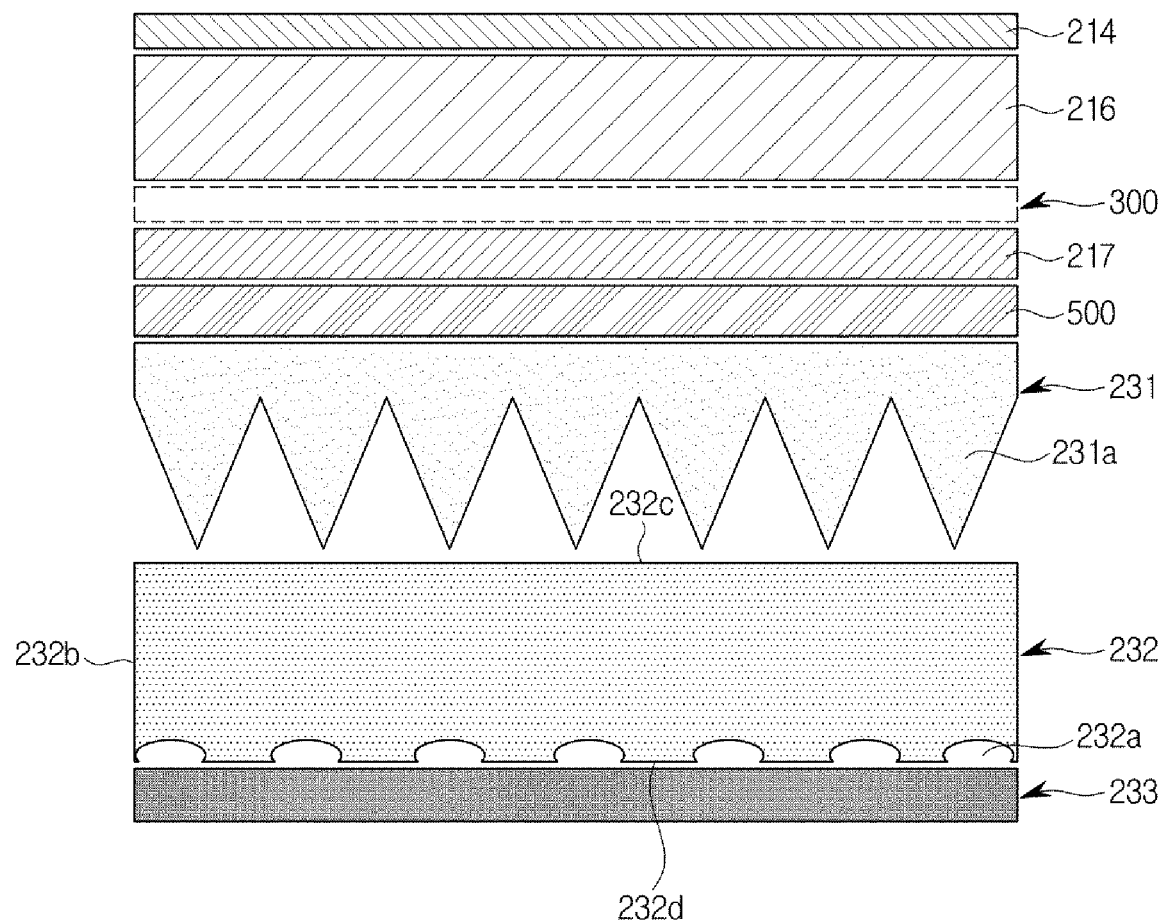
FIG. 16 is a diagram illustrating an example structure in which the reflective polarizer and the dichroic filter are included in the display apparatus according to an example embodiment.

As shown in FIG. 16, the display apparatus 1 may include the dichroic filter 300 disposed between the first polarizer 217 and the first substrate 216 to improve concentration of light emitted from the light source 234. The reflective sheet 233 may be disposed below the light guide plate 232, replacing the absorbing member 600, and the absorbing member 600 may be omitted.

Figure 17:
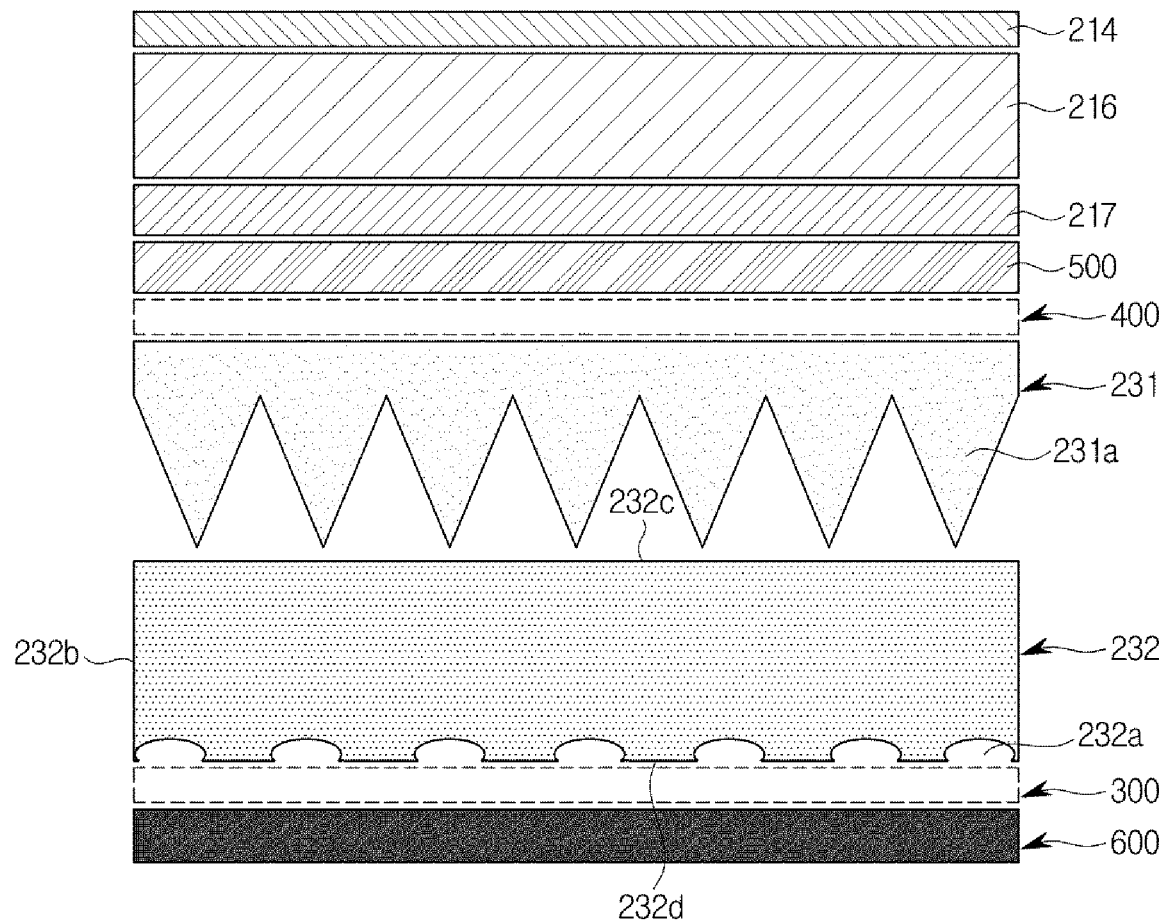
FIG. 17 is a diagram illustrating an example structure in which the reflective polarizer and the dichroic filter are included in the display apparatus according to an example embodiment.
Figure 18:
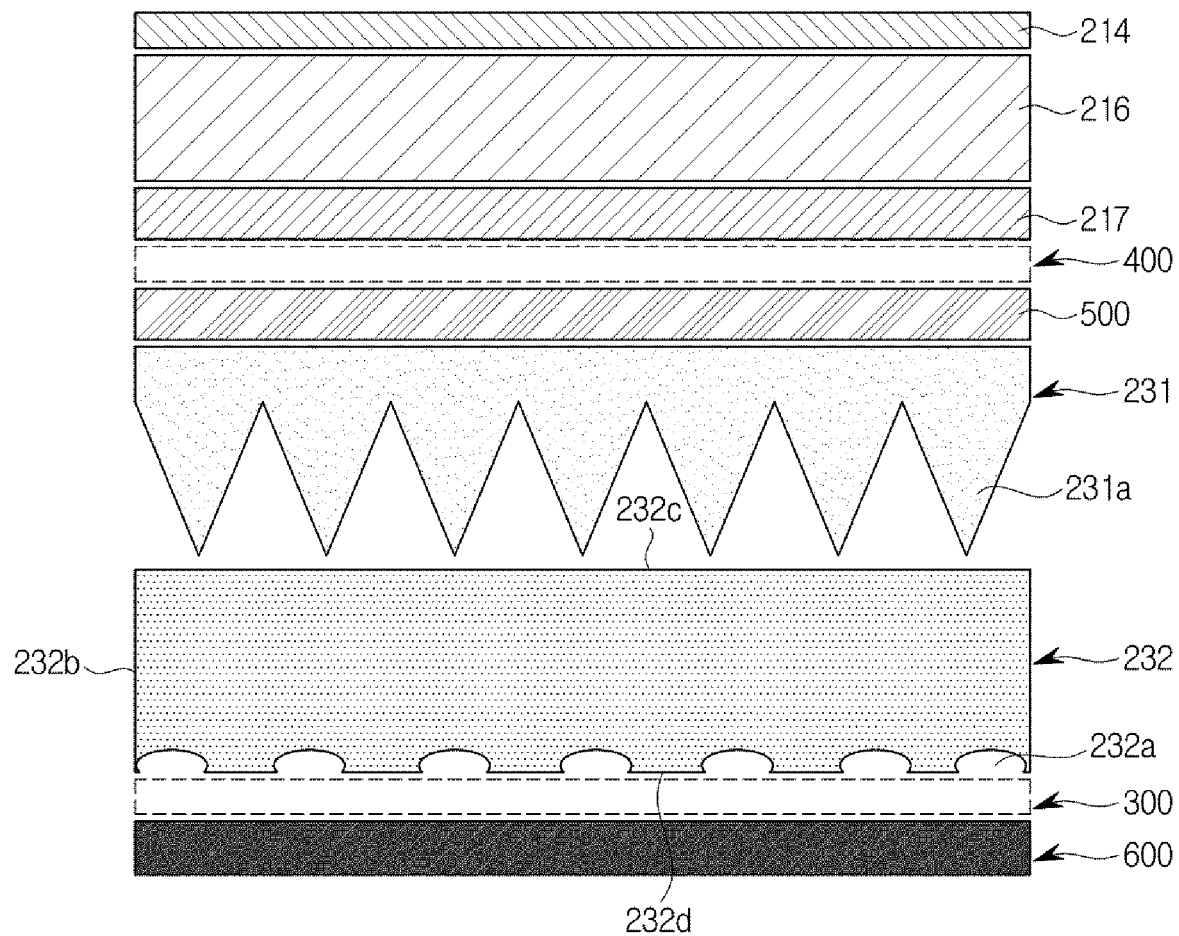
FIG. 18 is a diagram illustrating an example structure in which the reflective polarizer and the dichroic filter are included in the display apparatus according to an example embodiment.
Figure 19:
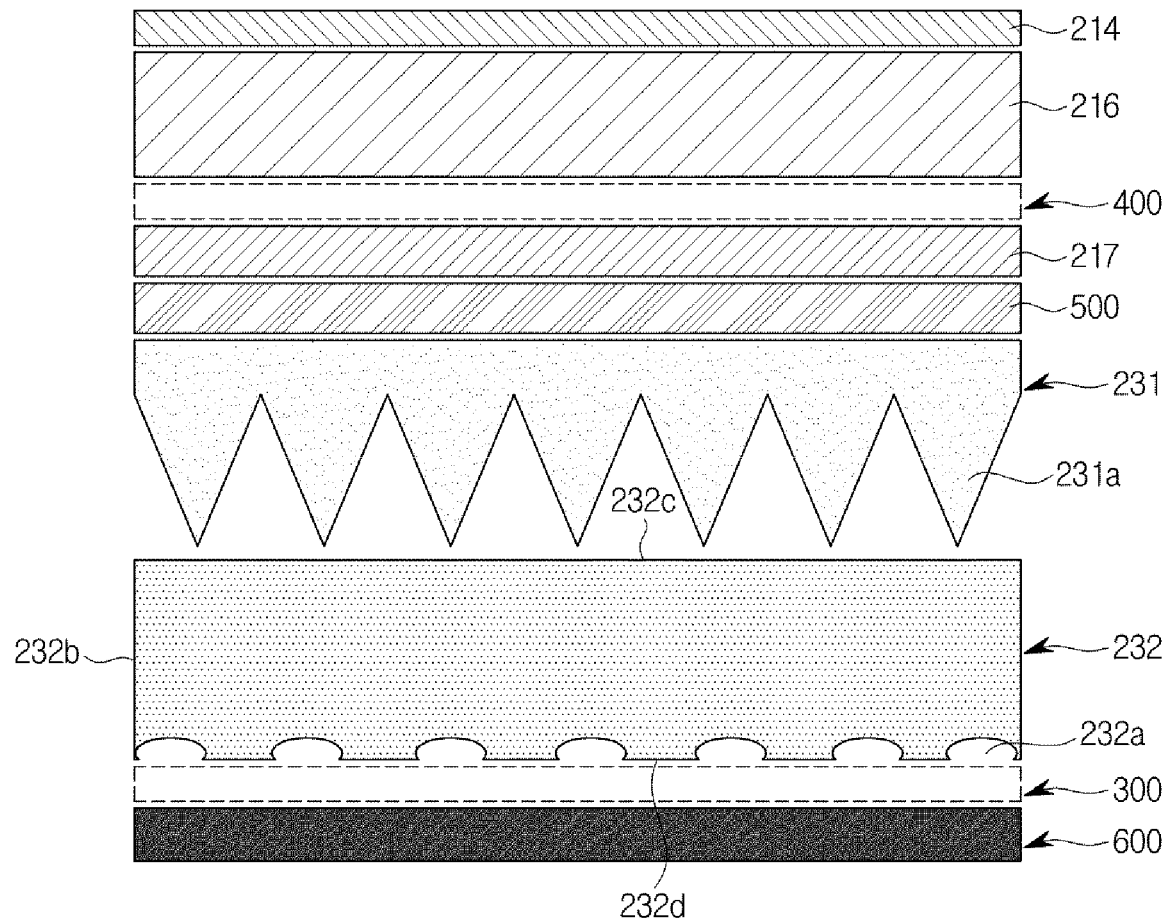
FIG. 19 is a diagram illustrating an example structure in which the reflective polarizer and the dichroic filter are included in the display apparatus according to an example embodiment.

FIG. 17, FIG. 18, and FIG. 19 illustrate diagrams of example structures in which a reflective polarizer and a dichroic filter are included in the display apparatus according to example embodiments. Hereinafter, descriptions overlapping with those in FIG. 1 to FIG. 5 will be omitted.

The display apparatus 1 may further include the reflective polarizer 500. A description of the reflective polarizer 500 overlaps with those in FIG. 13, FIG. 14, FIG. 15, and FIG. 16, and thus will be omitted.

According to an example embodiment, the display apparatus 1 may include at least one dichroic filter 300. When the reflective polarizer 500 is included in the display apparatus 1, concentration of light may be degraded. The at least one dichroic filter 300 may reduce or prevent degradation of concentration of light due to the inclusion of the reflective polarizer 500. In FIG. 17 to FIG. 19, example embodiments in which the two dichroic filters 300 and 400 are disposed will be described.

As shown in FIG. 17, the display apparatus 1 may include the dichroic filter 300 disposed below the light guide plate 232 to improve concentration of light emitted from the light source 234. The display apparatus 1 may further include the additional dichroic filter 400 disposed between the prism sheet 231 and the reflective polarizer 500 to improve concentration of light emitted from the light source 234 in association with the dichroic filter 300. When the dichroic filter 300 is disposed below the light guide plate 232, the reflective sheet 233 may be omitted.

As shown in FIG. 17, when the dichroic filter 300 replaces the reflective sheet 233, the display apparatus 1 may further include the absorbing member 600. As shown in FIG. 18, the display apparatus 1 may include the dichroic filter 300 disposed below the light guide plate 232 to improve concentration of light emitted from the light source 234. The display apparatus 1 may further include the additional dichroic filter 400 disposed between the reflective polarizer 500 and the first polarizer 217 to improve concentration of light emitted from the light source 234 in association with the dichroic filter 300. When the dichroic filter 300 is disposed below the light guide plate 232, the reflective sheet 233 may be omitted.

As shown in FIG. 18, when the dichroic filter 300 replaces the reflective sheet 233, the display apparatus 1 may further include the absorbing member 600.

As shown in FIG. 19, the display apparatus 1 may include the dichroic filter 300 disposed below the light guide plate 232 to improve concentration of light emitted from the light source 234. The display apparatus 1 may further include the additional dichroic filter 400 disposed between the first polarizer 217 and the first substrate 216 to improve concentration of light emitted from the light source 234 in association with the dichroic filter 300. When the dichroic filter 300 is disposed below the light guide plate 232, the reflective sheet 233 may be omitted.

According to an example embodiment, the display apparatus 1 may include the dichroic filter 300 disposed between the prism sheet 231 and the reflective polarizer 500, and the additional dichroic filter 400 disposed between the reflective polarizer 500 and the first polarizer 217.

According to an example embodiment, the display apparatus 1 may include the dichroic filter 300 disposed between the prism sheet 231 and the reflective polarizer 500, and the additional dichroic filter 400 disposed between the first polarizer 217 and the first substrate 216.

According to an example embodiment, the display apparatus 1 may include the dichroic filter 300 disposed between the reflective polarizer 500 and the first polarizer 217, and the additional dichroic filter 400 disposed between the first polarizer 217 and the first substrate 216. The reflective sheet 233 may be disposed below the light guide plate 232 replacing the absorbing member 600.

Figure 20:
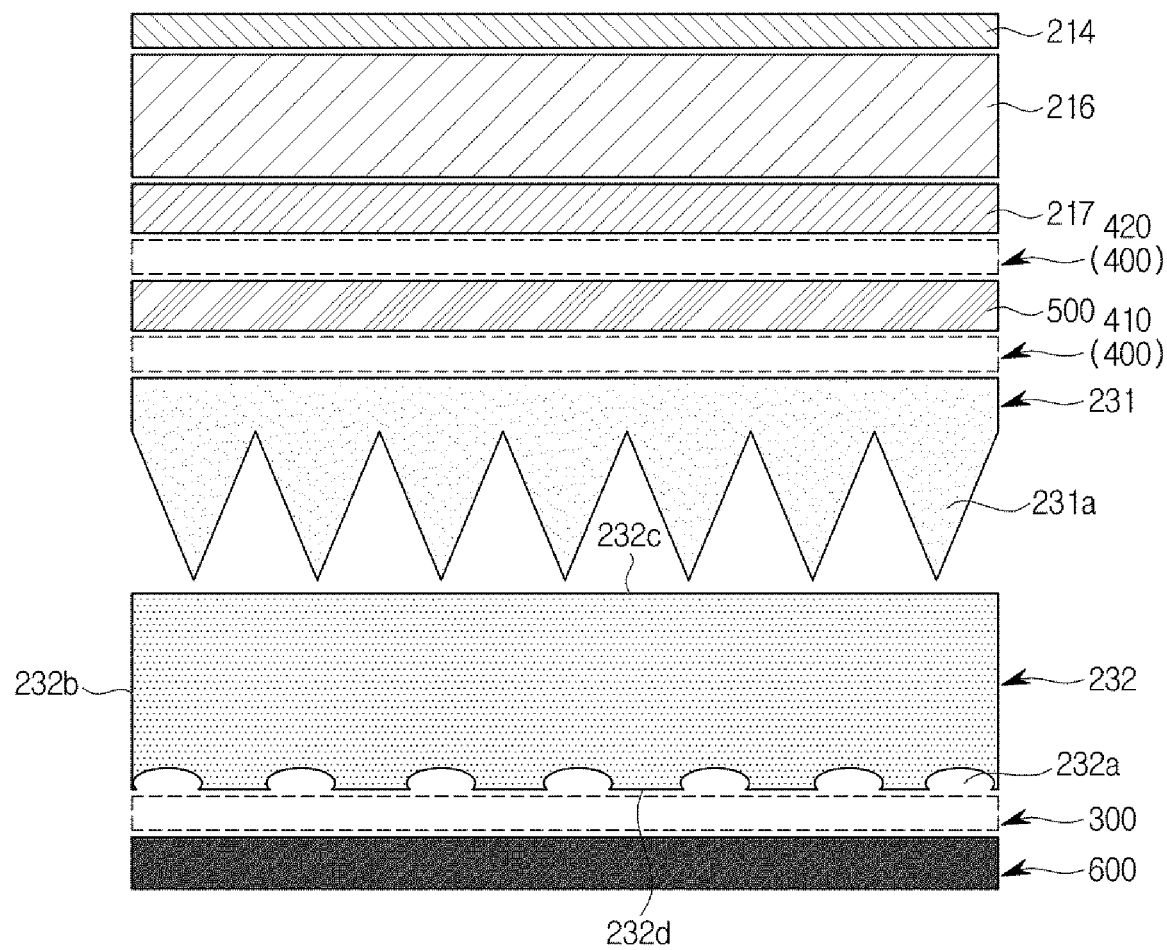
FIG. 20 is a diagram illustrating an example structure in which the reflective polarizer and the dichroic filter are included in the display apparatus according to an example embodiment.
Figure 21:
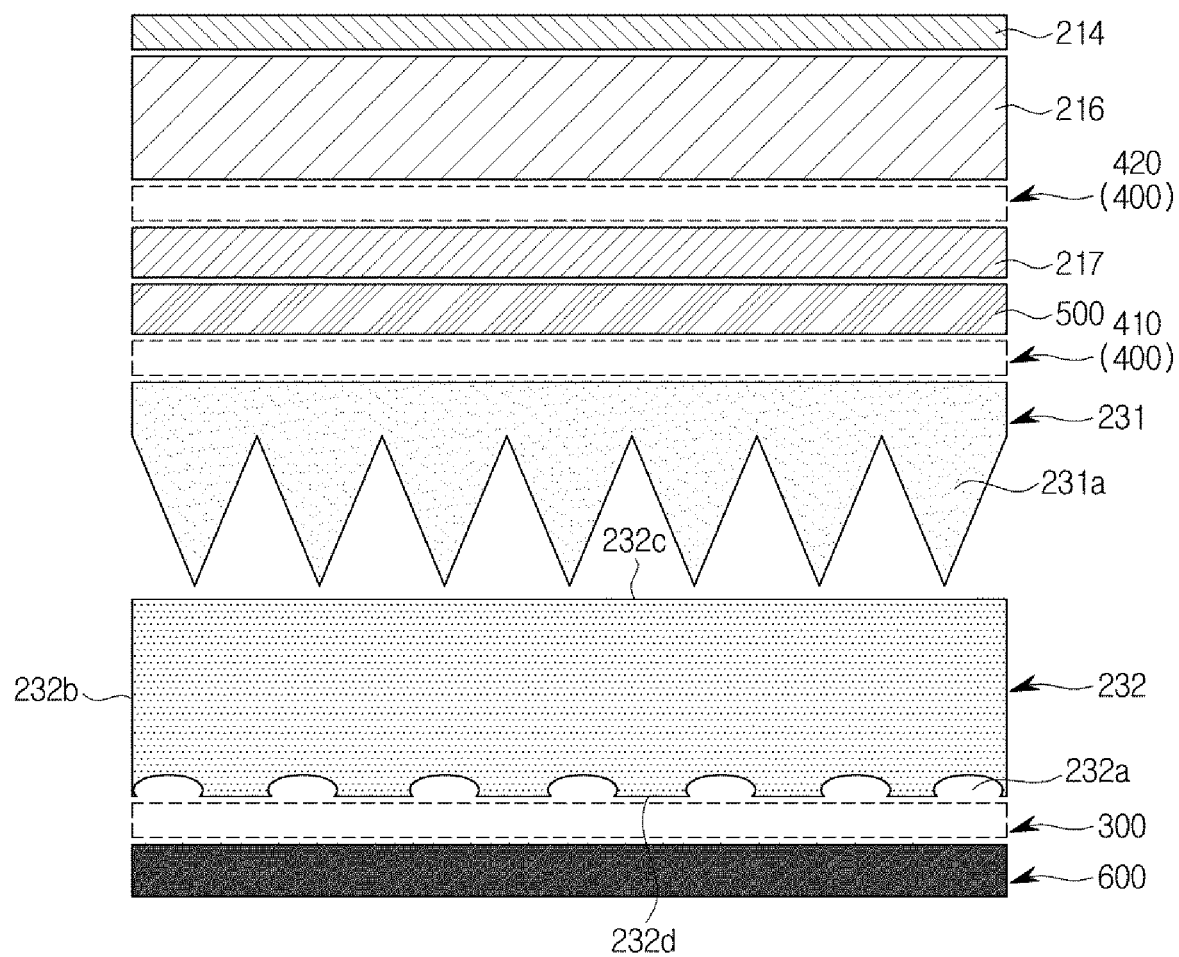
FIG. 21 is a diagram illustrating an example structure in which the reflective polarizer and the dichroic filter are included in the display apparatus according to an example embodiment.
Figure 22:
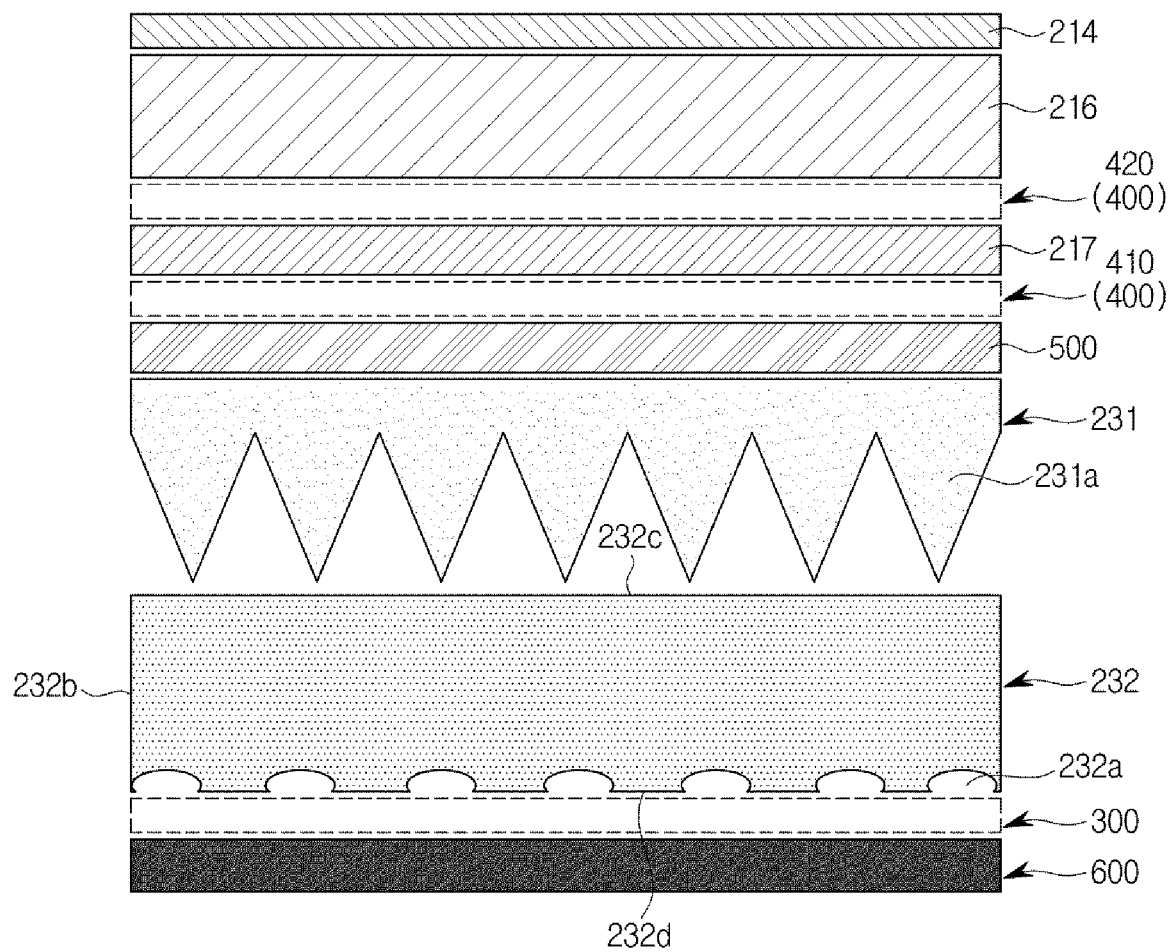
FIG. 22 is a diagram illustrating an example structure in which the reflective polarizer and the dichroic filter are included in the display apparatus according to an example embodiment.

FIG. 20, FIG. 21, and FIG. 22 illustrate diagrams of example structures in which a reflective polarizer and a dichroic filter are included in the of a display apparatus according to example embodiments. Hereinafter, descriptions overlapping with those in FIG. 1 to FIG. 5 will be omitted.

The display apparatus 1 may further include the reflective polarizer 500. A description of the reflective polarizer 500 overlaps with those in FIG. 13 to FIG. 16, and thus will be omitted.

The display apparatus 1 may include at least one dichroic filter 300. When the reflective polarizer 500 is included in the display apparatus 1, concentration of light may be degraded. The at least one dichroic filter 300 may reduce or prevent degradation of concentration of light due to the inclusion of the reflective polarizer 500. In FIG. 20 to FIG. 22, example embodiments in which three dichroic filters 300, 410, and 420 are disposed will be described.

As shown in FIG. 20, the display apparatus 1 may include the dichroic filter 300 disposed below the light guide plate 232 to improve concentration of light emitted from the light source 234. The display apparatus 1 may further include at least one additional dichroic filter 400 disposed above the light guide plate 232 to improve the concentration of light emitted from the light source 234 in association with the dichroic filter 300. The at least one additional dichroic filter 400 may include the first additional dichroic filter 410 disposed between the reflective polarizer 500 and the prism sheet 231. The at least one additional dichroic filter 400 may further include the second additional dichroic filter 420 disposed between the reflective polarizer 500 and the first polarizer 217. When the dichroic filter 300 is disposed below the light guide plate 232, the reflective sheet 233 may be omitted.

As shown in FIG. 20, when the dichroic filter 300 replaces the reflective sheet 233, the display apparatus 1 may further include the absorbing member 600.

As shown in FIG. 21, the display apparatus 1 may include the dichroic filter 300 disposed below the light guide plate 232 to improve concentration of light emitted from the light source 234. The display apparatus 1 may further include at least one additional dichroic filter 400 disposed above the light guide plate 232 to improve the concentration of light emitted from the light source 234 in association with the dichroic filter 300. The at least one additional dichroic filter 400 may include the first additional dichroic filter 410 disposed between the reflective polarizer 500 and the prism sheet 231. The at least one additional dichroic filter 400 may further include the second additional dichroic filter 420 disposed between the first polarizer 217 and the first substrate 216. When the dichroic filter 300 is disposed below the light guide plate 232, the reflective sheet 233 may be omitted.

As shown in FIG. 21, when the dichroic filter 300 replaces the reflective sheet 233, the display apparatus 1 may further include the absorbing member 600.

As shown in FIG. 22, the display apparatus 1 may include the dichroic filter 300 disposed below the light guide plate 232 to improve concentration of light emitted from the light source 234. The display apparatus 1 may further include at least one additional dichroic filter 400 disposed above the light guide plate 232 to improve the concentration of light emitted from the light source 234 in association with the dichroic filter 300. The at least one additional dichroic filter 400 may include the first additional dichroic filter 410 disposed between the reflective polarizer 500 and the first polarizer 217. The at least one additional dichroic filter 400 may further include the second additional dichroic filter 420 disposed between the first polarizer 217 and the first substrate 216. When the dichroic filter 300 is disposed below the light guide plate 232, the reflective sheet 233 may be omitted.

As shown in FIG. 22, when the dichroic filter 300 replaces the reflective sheet 233, the display apparatus 1 may further include the absorbing member 600.

In addition to the example embodiments shown in FIG. 20 to FIG. 22, the display apparatus 1 may include the dichroic filter 300 disposed between the prism sheet 231 and the reflective polarizer 500, the first additional dichroic filter 410 disposed between the reflective polarizer 500 and the first polarizer 217, and the second additional dichroic filter 420 disposed between the first polarizer 217 and the first substrate 216. The reflective sheet 233 may be disposed below the light guide plate 232 replacing the absorbing member 600.

FIG. 23 is a diagram illustrating an example structure in which a reflective polarizer and a dichroic filter are included in the display apparatus according to an example embodiment. Hereinafter, descriptions overlapping those in FIG. 1 to FIG. 5 will be omitted.

The display apparatus 1 may further include the reflective polarizer 500.

The display apparatus 1 may include at least one dichroic filter 300. When the reflective polarizer 500 is included in the display apparatus 1, concentration of light may be degraded. The at least one dichroic filter 300 may reduce or prevent degradation of concentration of light due to the inclusion of the reflective polarizer 500. In FIG. 23, an example embodiment in which a dichroic filter 300 and three additional dichroic filters 400 (that is, 410, 420, and 430) are disposed will be described.

As shown in FIG. 23, the display apparatus 1 may include the dichroic filter 300 disposed below the light guide plate 232 to improve concentration of light emitted from the light source 234. The display apparatus 1 may further include at least one additional dichroic filter 400 disposed above the light guide plate 232 to improve concentration of light emitted from the light source 234 in association with the dichroic filter 300. The at least one additional dichroic filter 400 may include a first additional dichroic filter 410 disposed between the prism sheet 231 and the reflective polarizer 500. Also, the at least one additional dichroic filter 400 may include a second additional dichroic filter 420 disposed between the reflective polarizer 500 and the first polarizer 217. Further, the at least one additional dichroic filter 400 may include a third additional dichroic filter 430 disposed between the first polarizer 217 and the first substrate 216.

When the dichroic filter 300 is disposed below the light guide plate 232, the dichroic filter 300 may replace the reflective sheet 233, and the reflective sheet 233 may be omitted.

As shown in FIG. 23, when the dichroic filter 300 replaces the reflective sheet 233, the display apparatus 1 may further include the absorbing member 600.

According to an example embodiment, the display apparatus 1 may further include a propagation path of light through which light emitted from the light source 234 is propagated. Also, the display apparatus 1 may further include a plurality of dichroic filters which are each disposed on the propagation path of light emitted from the light source 234.

The plurality of dichroic filters may include, for example, a first dichroic filter disposed below the light guide plate 232, and may further include a second dichroic filter disposed between the first polarizer 217 and the prism sheet 231.

The plurality of dichroic filters may include, for example, the first dichroic filter disposed below the light guide plate 232, and may further include the second dichroic filter disposed between the first polarizer 217 and the first substrate 216.

Here, the plurality of dichroic filters may be used as a term encompassing the dichroic filter 300 and the additional dichroic filters 400 which are described in FIG. 6 to FIG. 23.

According to example embodiments, a display apparatus may include at least one dichroic filter concentration of light emitted from a light source can be improved and to uniformly distribute light emitted from the light source onto a screen of the display apparatus.

Energy efficiency of the display apparatus can be improved by including a reflective polarizer in the display apparatus.

Degradation of the concentration of light emitted from the light source due to the inclusion of the reflective polarizer can be reduced or prevented by the including at least one dichroic filter in the display apparatus.

Example embodiments have been shown and described above, however, the present disclosure is not limited thereto, and modifications may be made by those skilled in the art without departing from the principles and technical spirit of the present disclosure, as defined by the appended claims, and their equivalents.

What is claimed is:
1. A display apparatus comprising:
 a display panel comprising a liquid crystal layer and a quantum dot color filter disposed on the liquid crystal layer;
 a light source configured to emit light;
 a light guide plate configured to guide the light emitted from the light source towards the display panel;
 a dichroic filter provided on a first side of the light guide plate that is opposite to a second side of the light guide plate on which the display panel is provided, the dichroic filter being configured to concentrate the light emitted from the light source; and
 an absorbing member disposed on the dichroic filter and configured to absorb light that passes through the dichroic filter.
2. The display apparatus of claim 1, wherein the light guide plate comprises a light incident surface on which the light emitted from the light source is incident and a light emitting surface from which the light incident on the light guide plate is emitted towards the display panel, and the display apparatus further comprises a prism sheet disposed between the light guide plate and the display panel, and configured to refract light transmitted from the light emitting surface of the light guide plate, the prism sheet comprising a plurality of prisms protruding toward the light emitting surface of the light guide plate.

3. The display apparatus of claim 2, wherein the light guide plate further comprises:
    a light emitting corresponding surface that is opposite to the light emitting surface; and
    a pattern in a form of a convex lens formed on the light emitting corresponding surface and configured to guide the light incident on the light incident surface of the light guide plate to the light emitting surface of the light guide plate.

4. The display apparatus of claim 2, wherein the display panel further comprises a polarizer disposed between the liquid crystal layer and the prism sheet, and configured to polarize light passing through the prism sheet, and
    the display apparatus further comprises an additional dichroic filter disposed between the polarizer and the prism sheet, and configured to concentrate the light emitted from the light source.

5. The display apparatus of claim 2, wherein the display panel further comprises:
    a polarizer disposed on the prism sheet and configured to polarize light that passes through the prism sheet; and
    a substrate disposed between the polarizer and the liquid crystal layer, and configured to apply a current to the liquid crystal layer, and
    wherein the display apparatus further comprises an additional dichroic filter disposed between the polarizer and the prism sheet, and configured to concentrate the light emitted from the light source.

6. The display apparatus of claim 2, wherein the display panel further comprises:
    a reflective polarizer disposed between the prism sheet and the display panel, and configured to polarize light that passes through the prism sheet; and
    a polarizer disposed between the reflective polarizer and the display panel, and configured to polarize light that passes through the reflective polarizer.

7. The display apparatus of claim 6, further comprising an additional dichroic filter disposed between the prism sheet and the reflective polarizer, and configured to concentrate the light emitted from the light source.

8. The display apparatus of claim 6, further comprising an additional dichroic filter disposed between the polarizer and the reflective polarizer, and configured to concentrate the light emitted from the light source.

9. The display apparatus of claim 6, wherein the display panel further comprises a substrate disposed between the liquid crystal layer and the polarizer, and configured to apply a current to the liquid crystal layer, and
    the display apparatus further comprises an additional dichroic filter disposed between the polarizer and the substrate, and configured to concentrate the light emitted from the light source.

10. A display apparatus comprising:
    a display panel;
    a light source configured to emit light;
    a light guide plate configured to guide the light emitted from the light source towards the display panel, the light guide plate comprising a light incident surface on which the light emitted from the light source is incident, a light emitting surface from which the light incident on the light guide plate is emitted towards the display panel, and a light emitting corresponding surface that is opposite to the light emitting surface;
    a dichroic filter provided on the light emitting corresponding surface of the light guide plate;
    at least one additional dichroic filter provided on the light emitting surface of the light guide plate; and
    an absorbing member disposed on the dichroic filter and configured to absorb light that passes through the dichroic filter.

11. The display apparatus of claim 10, wherein the at least one additional dichroic filter comprises a first additional dichroic filter, and
    the display apparatus further comprises a prism sheet disposed between the light guide plate and the first additional dichroic filter, the prism sheet comprising a plurality of prisms protruding toward the light emitting surface of the light guide plate.

12. The display apparatus of claim 11, wherein the display panel comprises a polarizer disposed on the prism sheet and configured to polarize light that passes through the prism sheet, and
    the first additional dichroic filter is disposed between the polarizer and the prism sheet.

13. The display apparatus of claim 12, wherein the display panel further comprises:
    a liquid crystal layer; and
    a substrate disposed between the polarizer and the liquid crystal layer, and configured to apply a current to the liquid crystal layer, and
    wherein the at least one additional dichroic filter further comprises a second additional dichroic filter disposed between the polarizer and the substrate.

14. A display apparatus comprising:
    a display panel comprising a liquid crystal layer and a quantum dot color filter disposed on the liquid crystal layer;
    a light source configured to emit light;
    a light guide plate configured to guide the light emitted from the light source towards the display panel, the light guide plate comprising a light incident surface on which the light emitted from the light source is incident, a light emitting surface from which the light incident on the light guide plate is emitted towards the display panel, and a light emitting corresponding surface that is opposite to the light emitting surface;
    a plurality of dichroic filters disposed on a propagation path of light through which the light emitted from the light source is propagated, the plurality of dichroic filters comprising a first dichroic filter provided on the light emitting corresponding surface of the light guide plate and configured to concentrate light emitted from the light source; and
    an absorbing member disposed on the first dichroic filter and configured to absorb light that passes through the first dichroic filter.

15. The display apparatus of claim 14, further comprising a prism sheet disposed on the light guide plate and configured to refract light emitted through the light emitting surface of the light guide plate, the prism sheet comprising a plurality of prisms protruding toward the light emitting surface of the light guide plate,
    wherein the display panel further comprises a polarizer disposed between the liquid crystal layer and the prism sheet and configured to polarize light that passes through the prism sheet.

16. The display apparatus of claim 15, wherein the plurality of dichroic filters further comprises a second dichroic filter disposed between the polarizer and the prism sheet, and configured to concentrate the light emitted from the light source together with the first dichroic filter.

17. The display apparatus of claim 15, wherein the display panel further comprises a substrate disposed between the polarizer and the liquid crystal layer, and configured to apply current to the liquid crystal layer, and the plurality of dichroic filters further comprises a second dichroic filter disposed between the polarizer and the substrate, and configured to concentrate the light emitted from the light source with the first dichroic filter.

* * * * *